United States Patent
Saxena et al.

(10) Patent No.: US 12,075,255 B2
(45) Date of Patent: Aug. 27, 2024

(54) SECURE WIRELESS COMMUNICATION SYSTEM AND METHOD

(71) Applicant: Western Digital Technologies, Inc., San Jose, CA (US)

(72) Inventors: Vishwas Saxena, Bangalore (IN); Aditya Gadgil, Bangalore (IN); Megha Sehgal, Bangalore (IN); Mukesh Kumar, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 333 days.

(21) Appl. No.: 17/556,913

(22) Filed: Dec. 20, 2021

(65) Prior Publication Data
US 2023/0199503 A1    Jun. 22, 2023

(51) Int. Cl.
*H04W 12/50* (2021.01)
*H04W 12/03* (2021.01)
(Continued)

(52) U.S. Cl.
CPC ............ *H04W 12/50* (2021.01); *H04W 12/03* (2021.01); *H04W 12/0471* (2021.01); *H04W 12/069* (2021.01)

(58) Field of Classification Search
CPC ..... H04W 12/50; H04W 12/069; H04W 4/80; H04W 12/06; H04W 12/041;
(Continued)

(56) References Cited

U.S. PATENT DOCUMENTS

| | | | |
|---|---|---|---|
| 8,868,913 B1 * | 10/2014 | Watsen | H04L 9/3265 709/227 |
| 9,538,372 B2 * | 1/2017 | Li | H04W 12/04 |

(Continued)

FOREIGN PATENT DOCUMENTS

EP    3637726 B1 *    7/2021    ......... H04L 63/0478

OTHER PUBLICATIONS

A Detailed Look at RFC 8446 (a.k.a. TLS 1.3). Cloudflare article available from https://blog.cloudflare.com/rfc-8446-aka-tls-1-3/.
(Continued)

*Primary Examiner* — Lizbeth Torres-Diaz
(74) *Attorney, Agent, or Firm* — Patent Law Works LLP

(57) ABSTRACT

A method for secure wireless communication executed by at least one processor of a device. A registration certificate is transmitted to the device by a host, the registration certificate including a Long Term Device Key (LTDK) and being generated by a registration server in response to the registration of the host as authorized to connect to the device. In response to receiving a request for securing a Bluetooth connection between the device and the host, the device transmits the LTDK to the host. The device receives, from the host, a connection certificate including connection data for establishing the connection between the host and the device. The connection certificate is signed by a private Long Term Host Key (LTHK) of the host, where the LTHK of the host and the LTDK of the device form a cryptographic Long Term Key pair. The device validates the connection certificate using the LTDK of the device to determine whether the host is authorized to connect to the device. If the host is authorized, then the device establishes a shared secret with the host enabling the encryption of data transmitted over a wireless channel between the device and the host.

20 Claims, 9 Drawing Sheets

(51) Int. Cl.
*H04W 12/0471* (2021.01)
*H04W 12/069* (2021.01)

(58) Field of Classification Search
CPC .............. H04W 12/0431; H04W 12/55; H04L 63/0823; H04L 9/0825; H04L 9/321; H04L 2209/80; H04L 63/065; H04L 63/08; G06F 21/33; G06F 21/44
See application file for complete search history.

(56) References Cited

U.S. PATENT DOCUMENTS

| | | | | |
|---|---|---|---|---|
| 10,015,158 B2* | 7/2018 | Bender | .................. | G06F 21/33 |
| 10,104,547 B1* | 10/2018 | Thanayankizil | ........ | H04W 4/44 |
| 10,595,352 B2* | 3/2020 | McColgan | ............ | H04W 12/50 |
| 11,246,032 B1* | 2/2022 | Maass | .................. | H04W 12/71 |
| 11,336,635 B2* | 5/2022 | Park | ........................ | H04W 4/70 |
| 2018/0375667 A1* | 12/2018 | Sovio | ...................... | H04L 9/321 |
| 2019/0166635 A1* | 5/2019 | McColgan | ............ | H04W 12/50 |
| 2019/0281449 A1 | 9/2019 | Luo | | |
| 2022/0022030 A1* | 1/2022 | Kumar | ................ | H04L 63/0442 |
| 2022/0294644 A1* | 9/2022 | Liu | ....................... | H04L 9/3263 |
| 2022/0330029 A1* | 10/2022 | Wang | ................. | H04W 12/108 |
| 2024/0096154 A1* | 3/2024 | Imanuel | ............. | H04L 63/0442 |

OTHER PUBLICATIONS

Whitfield Diffie and Martin E Hellman, "New Directions in Cryptography", IEEE Transactions on Information Theory vol. IT-22 No. 6, Nov. 1976.
Karim Lounis, Mohammad Zulkernine. Bluetooth Low Energy Makes "Just Works" Not Work. Cyber Security in Networking Conference, Oct. 2019, Quito, Ecuador. hal-02528877.

* cited by examiner

SECURE WIRELESS COMMUNICATION SYSTEM AND METHOD

TECHNICAL FIELD

This disclosure relates to a system and method for secure wireless communication between a user device, such as a data storage device, and a host computer system.

BACKGROUND

Wireless communication involves the transfer of information between two or more entities without the use of an electrical conduction based communications medium to perform the transfer. In the context of computing, wireless communication refers to the exchange of data between digital devices without requiring the data to be passed through a corresponding connector, such as a cable, wire pair, or other similar data transmission media, configured to physically link the devices. That is, communication of the data occurs over a "virtual" or "wireless" channel.

Wireless communication has become widespread as a means of communication between modem electronics and computing devices (referred to as "wireless devices"), due to advantages including increased accessibility, mobility, and flexibility with respect to exchanging data. Bluetooth is a wireless technology standard that is used for exchanging data between devices over short distances based on the establishment of an ad hoc (i.e., spontaneous peer to peer) connections the wireless devices (i.e., without an access point). Furthermore, Bluetooth devices are able to establish a connection without user intervention (e.g., automatically as soon as one device becomes in range of another).

Despite the advantages of wireless communication, the absence of a physical media. through which data is exchanged results in an inherent drawback of wireless devices. That is, an unauthorized third party (an "attacker") can detect data being transferred over a wireless channel merely by being in the transmission range of the devices and may intercept the transmitted radio waves in an attempt to access the data.

It is desirable to protect the data communicated over a wireless channel against access by unauthorized third parties. Although wireless networks usually attempt to secure the data transferred through a wireless channel, for example by using encryption methods, attackers may employ techniques that are based on compromising the channel itself. For example, the attacker may gather and interpret data at the packet level, which is referred to as "sniffing", and subsequently inject data into the channel to trick a pair of devices into believing that they are directly communicating with each other, when in fact they are actually communicating with the attacker. This is referred to as a man-in-the-middle (MITM) attack.

The security risks associated with the use of wireless technology have increased as the number of devices implementing wireless communications protocols has dramatically risen. In particular, wireless devices now permeate homes, offices and public places. As a consequence, it has become easier for an attackers to find a nearby wireless connection on which to execute MITM and other attacks.

SUMMARY

Disclosed herein is a method for secure wireless communication, the method executed by at least one processor of a device, and wherein the method comprises: receiving, from a host, a secure connection request for securing a Bluetooth connection between the device and the host; in response to receiving the secure connection request, transmitting a connection acknowledgement to the host, the acknowledgement including a Long Term Device Key (LTDK) of the device; receiving, from the host, a connection certificate including connection data for establishing the connection between the host and the device, wherein the connection certificate is signed by a private Long Term Host Key (LTHK) of the host, where the LTHK of the host and the LTDK of the device form a cryptographic Long Term Key pair; validating the connection certificate using the LTDK of the device to determine whether the host is authorized to connect to the device; and in response to determining that the host is authorized to connect to the device, establishing a shared secret with the host based on the connection data, the shared secret enabling the encryption of data transmitted over a wireless channel between the device and the host, wherein the LTDK is obtained from a registration certificate transmitted to the device by the host, the registration certificate being generated by a registration server in response to the registration of the host as authorized to connect to the device.

In some embodiments, the registration certificate is cryptographically secured by a registration server key pair associated with the registration server, the registration server key pair including: a private server key used by the registration server to cryptographically sign the registration certificate; and a public server key used by the device to verify the received signed registration certificate.

In some embodiments, the public server key is stored in a non-volatile memory of the device prior to the device receiving the registration certificate.

In some embodiments, the method further comprises: transmitting to the host, user device information including at least an identification key (IDK) of the device, wherein the user device information is provided to the registration server by the host as a request to register the host as authorized to connect to the device, and wherein in response to the registration server verifying, using the IDK of the device, that no host is registered as being authorized to connect to the device, receiving from the registration server, via the host, the signed registration certificate including the LTDK generated by the registration server, wherein the corresponding LTHK generated by the registration server is transmitted to the host.

In some embodiments, the shared secret is established by the exchange of public keys of: a short-term host key (STHK) pair of the host; and a corresponding short-term device key (STDK) pair of the device, wherein the keys of the STHK pair and the corresponding STDK pair are generated uniquely for a session of the Bluetooth connection.

In some embodiments, the connection acknowledgement includes, at least, a session identifier, the session identifier being uniquely generated by the device for the session.

In some embodiments, the connection certificate is generated by the host and includes, at least: the device LTDK; and the session identifier, of the received connection acknowledgement.

In some embodiments, the host secures the connection certificate by signing the connection certificate with the LTHK of the host, such that validation of the connection certificate with the LTDK verifies the host to the device for the session.

In some embodiments, the method further comprises: receiving a secondary connection request for securing a secondary Bluetooth connection between the device and a secondary host; in response to the secondary connection request, transmitting a secondary connection acknowledgement to the secondary host, the secondary connection acknowledgement including the LTDK of the device; receiving, from the secondary host, a secondary connection certificate including connection data for establishing the connection between the secondary host and the device, wherein the secondary connection certificate is cryptographically signed by the LTHK of the host; validating the secondary connection certificate to determine the secondary host as authorized to connect to the device; and in response to determining the secondary host as authorized to connect to the device, establishing a shared secret with the secondary host based on the connection data, the shared secret enabling the encryption of data transmitted between the device and the secondary host over the secondary Bluetooth connection, wherein the LTHK is transmitted to the secondary host by the registration server, in response to the host providing authorization for the secondary host to connect to the device.

Disclosed herein is a data storage device, comprising: a non-volatile storage medium configured to store user data; a communications module configured to transmit data wirelessly between a host computer system and the storage medium of the device, the module including a Bluetooth chip configured to establish a Bluetooth connection between the device and the host computer system; and a controller coupled to the storage medium and the communications module via a data path, the controller configured to: receive, from the host, a secure connection request for securing the Bluetooth connection between the device and the host; in response to receiving the secure connection request, transmit a connection acknowledgement to the host, the acknowledgement including a Long Term Device Key (LTDK) of the device; receive, from the host, a connection certificate including connection data for establishing the connection between the host and the device, wherein the connection certificate is signed by a private Long Term Host Key (LTHK) of the host, where the LTHK of the host and the LTDK of the device form a cryptographic Long Term Key pair; validate the connection certificate using the LTDK of the device to determine whether the host is authorized to connect to the device; and in response to determining the host as authorized to connect to the device, establish a shared secret with the host based on the connection data, the shared secret enabling the encryption of data transmitted over a wireless channel between the device and the host, wherein the LTDK is obtained from a registration certificate transmitted to the device by the host, the registration certificate being generated by a registration server in response to the registration of the host as authorized to connect to the device.

In some embodiments, the registration certificate is cryptographically secured by a registration server key pair associated with the registration server, the registration server key pair including: a private server key used by the registration server to cryptographically sign the registration certificate; and a public server key used by the device to verify the received signed registration certificate.

In some embodiments, the public server key is stored in a non-volatile memory of the device prior to the device receiving the registration certificate.

In some embodiments, the controller is further configured to: transmit, to the host, user device information including at least an identification key (IDK) of the device, wherein the user device information is provided to the registration server by the host as a request to register the host as authorized to connect to the device, and wherein in response to the registration server verifying, using the IDK of the device, that no host is registered as being authorized to connect to the device, receive from the registration server, via the host, the signed registration certificate including the LTDK generated by the registration server, wherein the corresponding LTHK generated by the registration server is transmitted to the host.

In some embodiments, the shared secret is established by the exchange of public keys of: a short-term host key (STHK) pair of the host; and a corresponding short-term device key (STDK) pair of the device, wherein the keys of the STHK pair and the corresponding STDK pair are generated uniquely for a session of the Bluetooth connection.

In some embodiments, the connection acknowledgement includes, at least, a session identifier, the session identifier being uniquely generated by the device for the session.

In some embodiments, the connection certificate is generated by the host and includes, at least: the device LTDK, and the session identifier, of the received connection acknowledgement.

In some embodiments, the host secures the connection certificate by signing the connection certificate with the LTHK of the host, such that validation of the connection certificate with the LTDK verifies the host to the device for the session.

In some embodiments, the controller is further configured to: receive a secondary connection request for securing a secondary Bluetooth connection between the device and a secondary host; in response to the secondary connection request, transmit a secondary connection acknowledgement to the secondary host, the secondary connection acknowledgement including the LTDK of the device; receive, from the secondary host, a secondary connection certificate including connection data for establishing the connection between the secondary host and the device, wherein the secondary connection certificate is cryptographically signed by the LTHK of the host; validate the secondary connection certificate to determine the secondary host as authorized to connect to the device; and in response to determining the secondary host as authorized to connect to the device, establish a shared secret with the secondary host based on the connection data, the shared secret enabling the encryption of data transmitted between the device and the secondary host over the secondary Bluetooth connection, wherein the LTHK is transmitted to the secondary host by the registration server, in response to the host providing authorization for the secondary host to connect to the device.

Disclosed herein is a host configured for secure wireless communication with a device, the host comprising: means for transmitting, to the device, a secure connection request for securing a Bluetooth connection between the device and the host; means for receiving, from the device, a connection acknowledgement including a Long Term Device Key (LTDK) of the device; means for generating a connection certificate including connection data for establishing the connection between the host and the device, wherein the connection certificate is signed by a private Long Term Host Key (LTHK) of the host, where the LTHK of the host and the LTDK of the device form a cryptographic Long Term Key pair; and means fir transmitting the connection certificate to the device to validate the connection certificate using the LTDK of the device, wherein, in response to the device determining that the host is authorized to connect to the device, the device establishes a shared secret with the host based on the connection data, the shared secret enabling the encryption of data transmitted over a wireless channel between the device and the host, wherein the LTDK is obtained from a registration certificate transmitted to the device by the host, the registration certificate being generated by a registration server in response to the registration of the host as authorized to connect to the device.

In some embodiments, the host comprises: means for receiving, from the device, user device information including at least an identification key (IDK) of the device; means for transmitting the user device information to the registration server as a request to register the host as authorized to connect to the device, wherein in response to the registration server verifying, using the IDK of the device, that no host is registered as being authorized to connect to the device, means for receiving, from the registration server, the signed registration certificate; means for transmitting the signed registration certificate to the device, wherein the signed registration certificate includes the LTDK generated by the registration server; and means for receiving, from e registration server, the corresponding LTHK generated by the registration server.

BRIEF DESCRIPTION OF DRAWINGS

Some embodiments are described herein below with reference to the accompanying drawings, wherein.

DESCRIPTION OF EMBODIMENTS

Figure 1A:
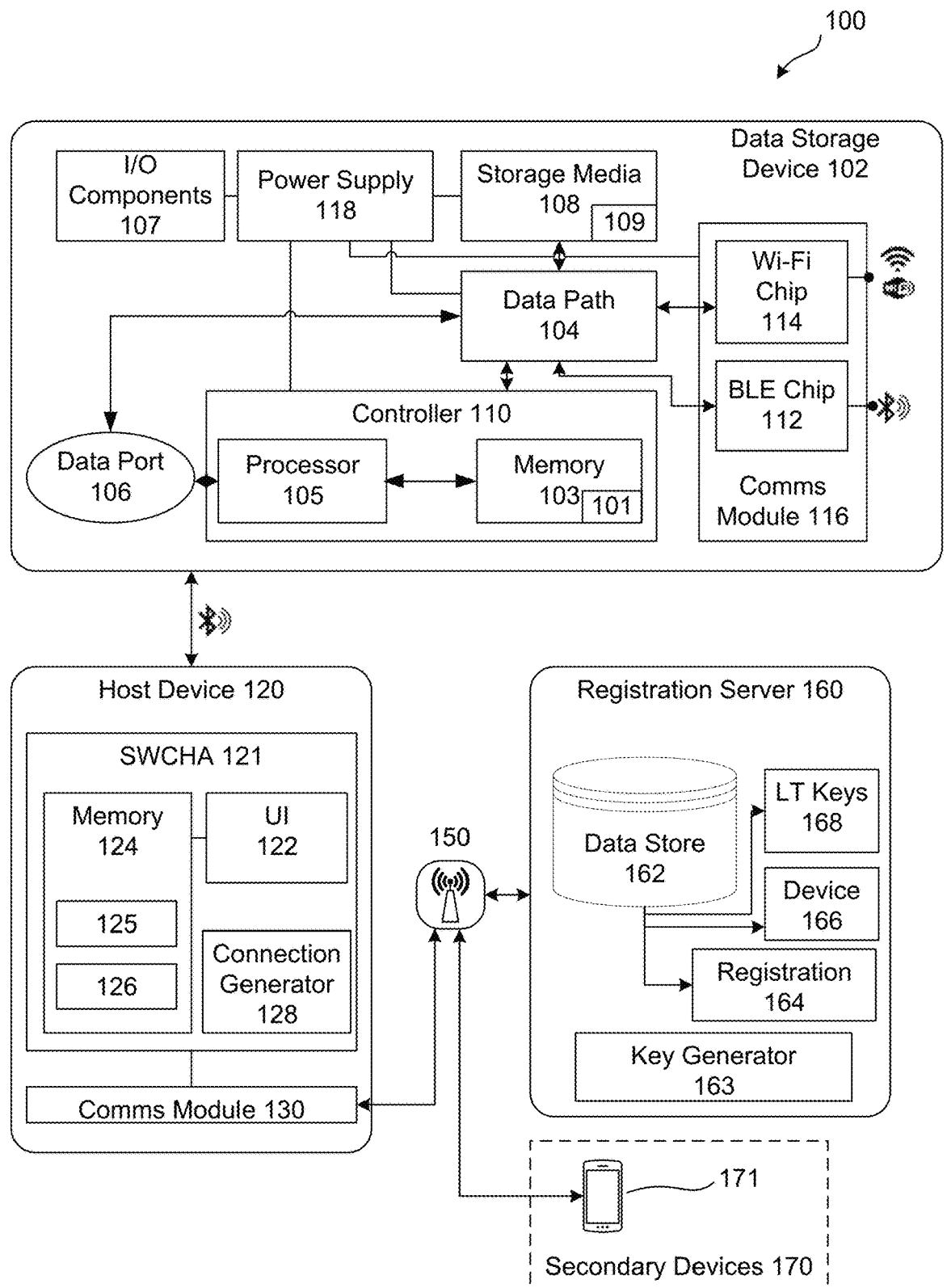
FIG. 1a illustrates an exemplary secure wireless communication system (SWCS) according to one embodiment.

Establishing a Bluetooth connection involves a "pairing" process to create a shared secret between the two devices in the form of a link key, The link key is then used to authenticate the devices to each other for the purpose of establishing a secure connection for the exchange of data. The security of the Bluetooth standard depends on the Secure Simple Pairing (SSP) protocol to create the shared link key (i.e., to perform the pairing procedure). There are tour association models of SSP depending on the input/output (I/O) capabilities of devices, including numeric comparison (NC), out of band (OOB), passkey entry (PE), and just works (JW). Currently, SSP uses one of these association models to complete the pairing procedure. Specifically, four association models form four different SSP protocols, i.e., the NC protocol, the OOB protocol, the PE protocol, and the JW protocol.

SSP enables secure pairing to be achieved based on a simple user interaction with the devices (i.e., via NC, OOB, or PE). However, this requires the devices to possess I/O and display capability, such as via the inclusion of touchscreens, keypads, buttons, and the like. This is not always possible due to the processing and/or physical limitations of electronic and computing devices that implement Bluetooth connectivity.

In devices without I/O or display capabilities, Bluetooth connectivity must proceed using the JW mode. However, a drawback of the JW mode is that it is not active Man In The Middle (MITM) safe. That is, the exchange of all keys in the JW protocol of SSP is over an unauthenticated channel, and an attacker can control the wireless channel by targeting one or both of the devices by injecting their own public key during the public key exchange stage. This provides a vulnerability in which the attacker may pair themselves with the target device, and thereby gain unauthorized access to the device.

There are several existing approaches to improving the security of the JW protocol to increase robustness against MITM attacks. Some prior approaches focus on precautionary actions in an attempt to reduce or eliminate the risk of a successful attack. However, these approaches generally result in compromised user experience. Some other approaches rely on each device hard coding the MAC address of the devices for which message decryption is enabled (e.g., white-listing of allowed addresses). However, an attacker may defeat this approach if they obtain a white-listed MAC address and then spoof their own device address to match the allowed address.

Furthermore, it is possible for an attacker to manipulate the device to change its perceived I/O capabilities thereby forcing the Bluetooth protocol to use Just Works and creating a vulnerability of the device to a MITM attack. Preventing this by enforcing particular I/O capabilities of the device, such as to enable the use of an alternative authentication mode (e.g., NC, OOB, or PE), may be both impractical and ineffective. It is desired to develop systems, products, and methods that address one or more of these problems, or that at least provide a useful alternative.

Overview

With reference to FIG. 1a, described herein are embodiments of systems and methods for secure wireless data communication between a user device (e.g., a data storage device (DSD) as described herein below) 102 and a host 120. User 102 and host 120 are Bluetooth enabled wireless devices configured to form connections using the SSP-JW protocol. Specifically, a secure Bluetooth connection is established between the user device 102 and host 120 via: (i) registration of the user device 102 in association with the host device 120 to enable secure verification of the identity of the host; and (ii) in response to securely verifying the host, dynamically generating a shared secret, based on a secure key exchange, for encryption of data communications between the host 120 and the device 102.

Registration of the host 120 with the user device 102 is performed during a registration phase which involves the generation, by a registration server 160, of a cryptographic key pair consisting of a private host registration key and a corresponding public (user) device registration key. The registration keys are securely distributed to the host 120 and user device 102 by the server 160, such as by: for the device registration key, the generation and transmission of a registration certificate to the user device 102 (via the host 120); and, for the host registration key, the use of a secure application layer protocol to communicate with host 120. The registration of the host 120 with the device 102 is secured against an attacker, and in particular against MUM attacks, via the protection of the host registration key. Specifically, secure communication protocols are used to transfer the host registration key from the server 160 to the host 120. Further, the host 120 stores and processes the host registration key securely, such as, for example via a dedicated hardware components.

A secure Bluetooth connection is initiated between the host 120 and the user device 102 during a connection phase, which occurs following the registration phase. To establish the shared secret, the host 120 provides proof of identity to user the device 102 via the generation and transmission of a connection certificate that is electronically signed and verified by the respective registration keys. The connection certificate is unique to the connection session, enabling the generation of session keys that vary over time. The verified connection certificate is used to secure the Bluetooth connection between the host 120 and the user device 102 by the creation of a session-specific shared secret for encrypting data transferred over the connection.

In the secure wireless communication processes described herein, security is provided by the validation of key exchanges in two distinct steps involving: (1) the host 120 and device 102 validating the registration certificate received from the registration server to verify their respective keys (e.g., via an electronic signing of the registration certificate by the server); and (2) the user device 102 validating the connection certificate received from the host 120 to verify the host identity prior to the generation of shared secret keys for the session. That is, unlike a typical Secure Socket Layer (SSL) exchange performed to connect a host to a device, a certificate authority is not required since registration and connection certificates are generated by computing devices that are part of the system (i.e., by the server 160 and host 120).

In the described system and processes, multiple sets of cryptographic key pairs are utilized over long and short temporal durations. Key pairs with a long duration are defined in the form of a registration server public key (RSPB Key) and private key (RSPR Key); and a private host registration key and public device registration key, as described above. The RSPB and RSPR keys are static as maintained by the registration server 160, The RSPB is provided to the host 120 and device 102 to enable verification of registration certificates generated by the server 160 (which are signed with the RSPR key known only to the server 160).

The host registration key and the device registration key are specific to each host-device registration within the system 100, and are maintained by the respective devices throughout the registration lifetime. To avoid confusion, the host registration key and the device registration key are referred to herein below as "Long Term Host Key" (LTHK) and "Long Term Device Key" (LTDK) respectively. The LTHK and LTDK values are generated by the server 160 according to a public-private key cryptosystem, such as Elliptic Curve Cryptography (ECC) in the described embodiments. The LTHK and LTDK establish the identity of host 120 and device 102 for their lifetime, and are used to validate the Session Keys using the Elliptic Curve Digital Signature Algorithm (ECDSA).

The shared secret is generated based on dynamically varying session keys that are generated by the host 120 and user device 102 in corresponding cryptographic key pairs. For example, in one embodiment the Elliptical Curve Diffie-Hellman (ECDH) technique is used to generate the session keys in each device. The session keys are generated based on session data that changes for each connection request (e.g., via randomization of the session identifier). These key pairs are "short-term" in the sense of being destroyed following the generation of the shared secret (i.e. they are re-generated for each connection session between a registered host and user device). To distinguish from the long term keys discussed above, the session keys are referred to herein below as a Short-Term Host Key (STHK) pair of the host 120, and a corresponding Short-Term Device Key (STDK) pair of the device 102.

The secure wireless communication method described herein therefore combines public key (AES) and private key (ECDH) cryptography with signature verifications (i.e., using a private key for signature generation and a public key to verify the signature) to secure a wireless connection initiated over an existing Bluetooth protocol. That is, a symmetrically encrypted channel is formed based on a shared secret negotiated using asymmetric cryptography and certificates confirming an authorization of the host 120 to connect with the device 102. The resulting encrypted channel is secured against MITM attacks, and can be subsequently used for transferring sensitive data between the host 120 and the device 102. For example, the host 120 may utilize the secure Bluetooth channel to provide authentication data to the user device 102, enabling the device 102 to connect to one or more other devices or networks.

The described embodiments of the secure wireless communication methods and systems achieve the following advantages over conventional approaches to Bluetooth connectivity: (i) protection is provided against a MITM attack on a Bluetooth connection formed using existing data link layer protocols, such as SSP-JW; by securing communication at the application layer with minimal latency; (ii) achieving Perfect Forward Secrecy (PFS) to protect the established Bluetooth channel by dynamically generating the shared secret for every connection (i.e., thereby protecting against an attacker that has gained knowledge of the Long-Term key pair) and the use of ECC for the individual session exchanges (i.e., thereby protecting against attacks that rely on traffic interception to determine a device private key for a particular previous session); (iii) use of a remotely located registration server 160 as a centralized point of generation for Long-Term key data, representing the registration of particular the user device 102 with the host 120, which enables each device to validate a received connection request (i.e., by verifying the registered key pair) in real-time; and (iv) providing secure access of a secondary host to the device 102 based on a pre-existing registration of the device with the (primary) host 120, and the dynamic generation of a connection token (certificate) by the registration server 160 to enable the secondary host(s) to establish a secure connection to the device 102 subject to authorization by the primary host 120.

Wireless Data Storage Device

FIG. 1a shows an embodiment of the secure wireless communication system (SWCS) 100 including a user device 102, a host computing system 120, and a registration server 160. Optionally, the SWCS 100 may include one or more secondary devices 170. In the described embodiments, user device 102 is a wireless DSD comprising a controller 110, a storage medium 108, a communications module 116, a data path 104, and, optionally, one or more data ports 106.

The communications module 116 comprises one or more hardware components configured to perform wireless data transmission between the DSD 102 and a connected device, including at least data transmission according to a Bluetooth protocol. In the described embodiments, the module 116 is a BLE-Wi-Fi module including: (i) a Bluetooth Low Energy (BLE) chip 112 configured to implement Bluetooth 4.0 and BLE protocols (e.g., Cypress, CYW54907, CYW20819); and (ii) a Wireless LAN (Wi-Fi) chip 114 configured to implement the IEEE 802.11 family of standards for connecting devices through wireless access points and the Internet.

The data path 104 comprises one or more data transfer components configured to transmit data between the storage medium 108, and the BLE-WiFi module 116 and/or the data port 106. For example, the data path 104 may include one or more data buses to transfer data. from BLE and WiFi chips of module 116 to the storage medium 108. The data port 106 is configured to transmit data between the host 120 and the DSD 102 and includes control operations to translate interface protocols (e.g., USB-C to NVMe), and to provide other general device functionality (e.g., to charge an internal power supply 118 of the DSD 102). In some embodiments, the data port 106 may lack an ability to transfer data to, or receive data from, the data path 104. In such embodiments, the exchange of data from the host 120 and the storage medium 108 of the DSD 102 is performed exclusively by wireless communications via the BLE and/or Wi-Fi 114 chips of communications module 116.

The DSD 102 provides functionality to the host 120 of a block data storage device. The storage medium 108 of the DSD 102 is configured to store user content data 109, The user content data 109 includes one or more blocks of data organized into files, for example including images, documents, videos, etc., according to a particular file system operable by the host computer 120. The storage medium 108 is non-transitory such as to retain the stored block data irrespective of whether the medium 108 is powered. The medium 108 may be a solid state drive (SSD), hard disk drive (HDD) with a rotating magnetic disk, or any other non-volatile storage media. Further, the storage medium 108 may be a block data storage device, which means that the user content data 109 is written in blocks to the storage medium 108 and read in blocks from the storage medium 108.

In some embodiments, the DSD 102 includes a cryptography engine (not shown) configured to receive, interpret and execute commands received from the host 120 according to a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI), NVMe, I2C, and other proprietary architectures. The cryptography engine (not shown) is connected between the data path 106 and the storage medium 108 and is configured to use a cryptographic key to encrypt user content data 109 to be stored on the storage medium 108, and to decrypt the encrypted user content data 109 stored on the storage medium 108.

Some embodiments of the DSD 102 include I/O components 107 that enable the DSD 102 to receive interactive input from a user, and to provide output to the user in relation to the operation of the DSD 102. In some embodiments, the 110 components 107 include one or more display components configured to display textual and/or graphical content to the user. The display components may be optionally coupled to, or integrated with, the data entry components such as a keypad and/or one or more buttons. In the other embodiments, the DSD 102 lacks any input components, and such that I/O components 107 may only include non-interactive display elements, such as light-emitting diodes (LEDs). This prevents a user from providing the DSD 102 with any interactive input, which may be advantageous: as a means to improve security against physical manipulation of the device 102; and/or to facilitate a reduction in the physical size of the device 102 (i.e., where there is no ability to place screens or keypads/buttons on the device).

The controller 110 includes a processor 105 configured to execute program code stored within a non-volatile system memory 103 to control the operation of the DSD 102. In the described embodiments, the system memory 103 is configured to store data, including at least: a unique identifier of the DSD 102 referred to as the device identity key (IDK); the LTDK of the DSD 102; one or more certificates (user and registration, as described below) for performing secure wireless communication; a short-term device key (STDK) pair of the DSD 102 (as described below); and a registration server public key (RSPB Key). In some embodiments, the RSPB Key is programmed into the DSD 102 at the time of manufacture. In other embodiments, the RSPB Key may be delivered to the memory 103 via a data transfer from an external device (e.g., a flash update through data port 106).

Processor 105 is configured to control the operation of the DSD 102, by performing control operations to facilitate secure wireless transfers of data to the host 120, or other devices, by issuing instructions to the module 116 (e.g., to direct BLE chip 112 to initiate a Bluetooth pairing with the host 120). In the described embodiments, the memory 103 stores a Secure Wireless Communication Device Application (SWCDA) 101 that, when executed by the processor 105, implements the functionality associated with secure wireless Bluetooth device-to-host registration and connection, as described below.

The implementation of the processor 105, memory 103, and/or SWCDA 101 may vary according to the specifications of the device 102. For example, the SWCDA 101 may be a standalone software application executing within an operating system environment of the device 102. In the described embodiments the device 102 is a wireless DSD, and the SWCDA 101 is implemented as a micro-program arranged as one or more code modules and including data and instructions in relation to: one or more Bluetooth stack protocols, EVT flows for operational modes (e.g., BLE mode), inter-chip BLE-to-Wi-Fi communication, and secure registration and connection processes, such as 302 and 304 described below. In some embodiments, the SWCDA 101 micro-program also includes one or more open source code libraries for performing cryptographic key generation and verification operations((e.g., FCC, and Asymmetric Encryption Standard (AES) algorithm libraries).

In some embodiments, the controller 110 may also be configured to perform other functions, such as for example, controlling access of connected devices (such as host computer 120) to the user content data 109 of the storage medium 108. For example, the processor 105 may be configured to enable or disable access to the storage medium 108 via the data path 104, based on an authentication system (e.g., subject to the verification of authorization credentials supplied to the DSD 102).

Although the user device 102 is a wireless data storage device in the described embodiments, in other embodiments the user device 102 may be any wireless device configured form a Bluetooth connection with the host system 120, such as a mobile computing device (e.g., laptops and tablets), a location device (e.g., GPS transceivers), a health device (e.g., medical and fitness monitors); a household appliances or appliance control device (e.g., TVs, lighting systems, fridges and remote controls for such devices) and a smart communication device e.g., smartphones and watches).

Host Computer Device

Figure 2:
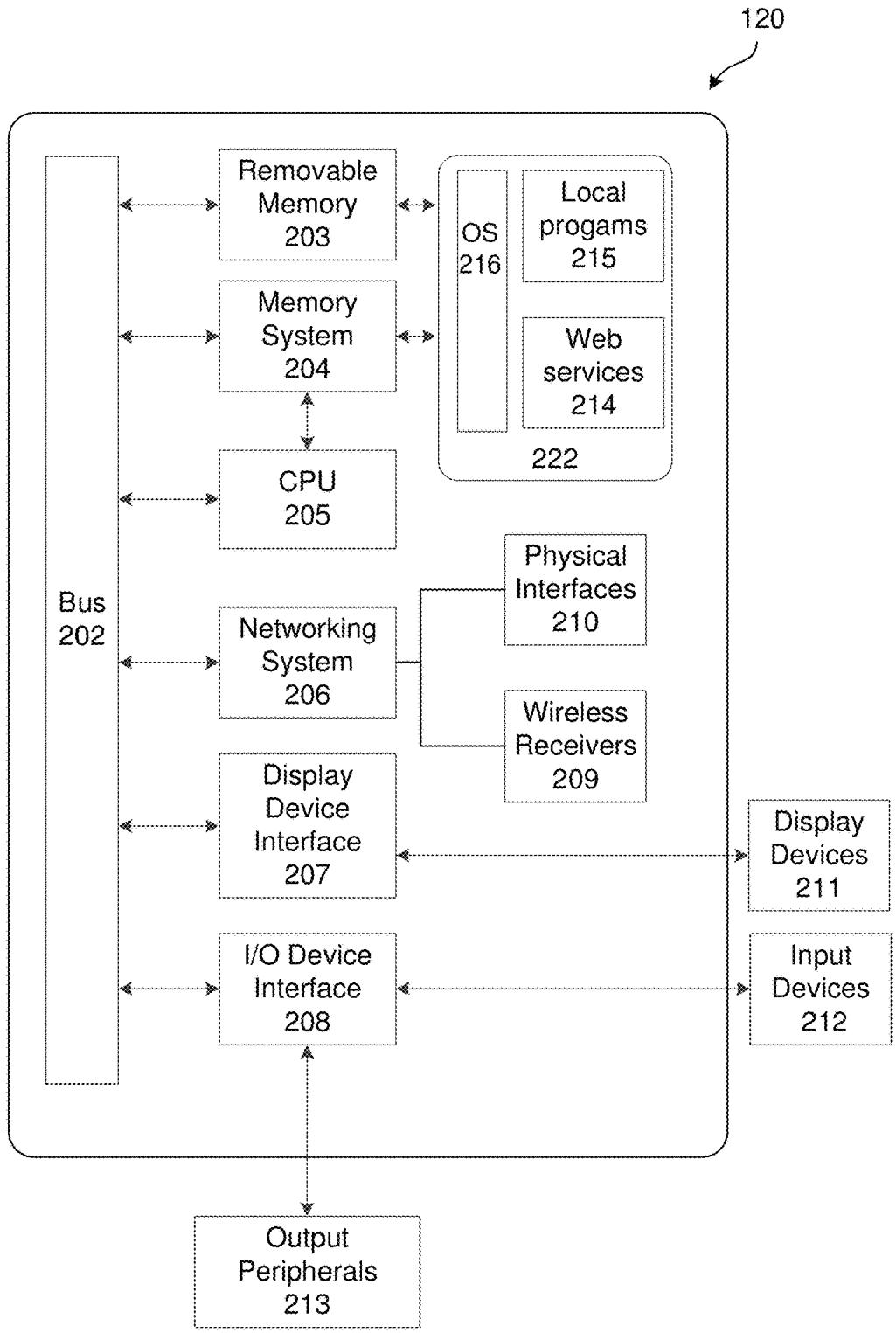
FIG. 2 is a block diagram of an exemplary host device implemented as a mobile computing device according to one embodiment.

Referring back to FIG. 1a, the host device 120 is configured to communicate with the DSD 102 through a direct wireless connection, and with the registration server 160 through communications network 150. In the described embodiments, the host device 120 is a mobile computing device, such as a smart phone or tablet (as shown in FIG. 2 and described below). The host 120 is configured to execute a Secure Wireless Communication Host application (SW-CHA) 121, which may be: a mobile application in the form of a dedicated software program obtainable from a digital distribution platform that provides applications for an operating system executing on the device (e.g. Google Play Store or Apple Store). Alternatively, the SWCHA 121 may be a. generic software application, such as a web browser configured to render one or more webpages hosted by a dedicated web server (e.g., as provided by the manufacturer of the DSD 102).

SWCHA 121 includes at least, a user interface module 122, and a local memory module 124 configured to store data in relation to the operation of the host 120 in association with one or more registered devices 102. For example, in some embodiments the memory 124 is configured to store registration data 126 for each device 102 registered to the host 120, including: an identifier of the DSD 102 (e.g., the IDK); a LTHK for the host 120; and a corresponding registration certificate containing a LTDK of the device 102, where the LTHK and LTDK are a cryptographic LT key pair (as described below).

In some embodiments, the memory module 124 is also configured to store session data 125 including data related to any active secure wireless communication session presently established between the host 120 and a registered device 102. The session data 125 may include: the IDK of the device 102; a session ID for the session; a connection certificate generated by the SWCHA 121 for the device 102 and session ID; and a shared secret (e.g., a cryptographic key pair) enabling the encryption of data transmitted over a wireless channel between the device 102 and the host 120, for the session.

FIG. 2 illustrates a block diagram, according to one embodiment, of a host device 120 implemented as a mobile computing device, and comprising a central system bus 202, a removable memory 203, a memory system 204, a central processing unit (CPU) 205, a networking system 206, display interfaces 207, and I/O device interfaces 208. The processing unit 205 may be any microprocessor which performs the execution of sequences of machine instructions, and may have architectures consisting of a single or multiple processing cores such as, for example, a system having a 32- or 64-bit Advanced RISC Machine (ARM) architecture (e.g., ARMvx). The processor 205 issues control signals to other device components via the system bus 202, and has direct access to at least some form of the memory system 204.

The memory system 204 provides internal media for the electrical storage of the machine instructions required to execute the user application. The memory system 204 may include random access memory (RAM), non-volatile memory (such as ROM or EPROM), cache memory and registers for fast access by the processing unit 205, and high volume storage subsystems such as hard disk drives (HDDs), or solid state drives (SSDs). Individual memory system components, such as the high volume storage subsystems, may include separate interfaces and/or buses to the main system bus in order to increase data transfer efficiency. A removable memory system 203 may be implemented in the form of flash drives or removable high volume storage devices, connectable to the device 120 via a data port implementing a particular data transfer protocol, such as for example Universal Serial Bus (USB).

A portion of the non-volatile memory within the memory system 204 may contain a Basic. Input/Output System (BIOS) which includes routines facilitating the communication of data and control signals between components of device 120. The processes executed by the host 120 are implemented as programming instructions of one or more software modules 222 stored on non-volatile storage of the memory system 204 and/or removable memory 203. In some other embodiments, the processes may be executed by one or more dedicated hardware components, such as field programmable gate arrays (FPGAs) and/or application-specific integrated circuits (ASICs).

The modules stored include an operating system 216, one or more local application programs 215, and one or more web services modules 214 providing Internet or networked data access functionality. As described herein, the one or more local application programs includes the SWCHA 121. Program data stored within the modules 222 may include data instructions and results produced or used by the SWCHA 121. More generally application programs 215 may include methods, data structures or other software services that define data or perform functions as required by the device 120. The data and instructions of an application program 215, and the operating system 216, may reside in multiple parts of the memory system 204, including the registers, cache, main memory, and high volume storage, or in the removable memory 203.

The system bus 202 provides functionality enabling the exchange of data between the components of the device 120. The system bus enables the processing unit 205 to issue control signals to other components, including memory system 204, for the purpose of transferring data. The system bus 202 may be of varying structure, and may possess one or more sub-buses such as a memory bus interconnecting the memory system 204 components and/or or a peripheral bus such as AGP or PC1.

The I/O device interface 208 provides functionality enabling the user to interact with the device 120 via one or more I/O devices such as a mouse and keyboard. Other external user input devices 212 which may be connected include a microphone, an IR remote control, camera, and gesture systems. The device 120 includes one or more onboard input devices such as a touchpad or touch screen enabling a user to interact with the device 120. The I/O device interface 208 also provides functionality for the device 120 to instruct output peripherals 213, which may include printers, audio devices, and imaging devices.

The display device interface 207 may include one or more dedicated graphics interfaces, which transmit graphics and video signals between the device 120 and display devices 211. The display devices 211 may consist of inbuilt displays, including for example a display panel. In the described embodiments, display devices 211 are at least configured to display an indication of the device to which a secure wireless connection is generated (e.g., DSD 102) visually to the user, as instructed by the SWCHA 121.

The device 120 is connectable to a networking system 206 through a wireless or wired transmission media enabling the logical connection of the host computing device 120 to other networked computing devices. Connections to networks or other computing devices are formed via communication subsystem 130, which may include wireless transceivers 209 and/or physical interfaces 210. Communication subsystem 130 enables the exchange of data between the host 120 and one or more other devices. Communications subsystem 130 is configured to connect the host 120 to the one or more other devices via a communications network which may be a local area network (LAN) or a wide area network (WAN), such as the Internet.

In the described embodiments, the communication subsystem 130 is configured to implement one or more Bluetooth protocols, including BLE SSP-JW, for direct wireless communication with the device 102. In some embodiments, the host 120 also implements the IEEE 802.xx family of protocols for wired or wireless communication with registration server 160, and one or more secondary devices 170, over network 150 (i.e., including one or more LANs, WANs, and/or Internet networks).

The skilled person in the art will appreciate that many other embodiments may exist including variations in the hardware configuration of device 120, and the distribution of program data and instructions to execute the SWCHA 121.

Registration Server

With reference to FIG. 1a, the registration server 160 is implemented as one or more computing devices configured to operate as a web server. The registration server 160 includes computing components configured to execute one or more modules including, for example, an operating system, one or more local application programs, and one or more web services modules providing Internet or networked data access functionality. The web sen'ices modules may include web server software (e.g., Apache), scripting language modules (e.g., PHP, or Microsoft ASP), and structured query language (SQL) support modules (e.g., MySQL) enabling data to be stored in, and retrieved from, a data store 162.

In the described embodiments, data store 162 is configured as an SQL database with one or more tables including: a Registration table 164; a Device Info table 166; and a Long Term Key table 168. Registration table 164 records the registration of a device, such as DSD 102, with a corresponding host device 120. Each registration table entry identifies the device 102 and host 120 pair by indexing corresponding entries in the Device Info table 166. Registration table 164 also records the Long Term (LT) Key pair associated with a registration of a device with a host by referencing an entry in the Long Term Key table 168.

The Registration table 164 is configured to record additional information such as an indication of the role of each device in the registration. A device with the role of the 'host' acts as the controller of the secure wireless communication (SWC) functionality with respect to its corresponding registered 'user' device. That is, the device with the 'host' role executes the SWCHA 121 for performing secure registration and connection operations on the 'user' device. For example, the DSD 102 is designated as a 'user' device, and the host computer 120 is designated as a 'host' device in the embodiments described herein. In some embodiments, a particular device (e.g., "Smartphone 1") may be registered as a 'host' and a 'user' with respect to two other distinct devices (e.g., as a host to a "Smart watch" user device, and as a user to a "Smartphone 2" host device). This is represented by two distinct entries in the Registration table 164.

The Device Info table 166 records information identifying each host 120 and user device 102 known to the SWCS 100. Each entry of the Device Info table 166 includes a device identifier key (IDK) uniquely identifying the device. The IDK may be a globally unique value which distinguishes the device 102 from all others such as a serial number of the device 102 generated at the time of manufacture. In other embodiments, the IDK may be generated by the server 160 to locally distinguish the each device from all other devices managed by the system 100. For example, the server 160 may designate an IDK for device 102 based on a name or label of the device, as specified arbitrarily by a user of the host 120 (e.g., at a time when the device 102 is registered to the host 120, and via the SWCHA 121).

In some embodiments, the Device Info table 166 is configured to store general information related to the properties of the device, as obtained from the SWCHA 121. The device properties may include, for example, an indication of the device operating system, a last known IP address of the device, a MAC address of the device etc.

Host device 120 provides device information to the registration server 160 for storage in Device Info table 166 via the SWCHA 121. In some embodiments, the SWCHA 121 provides the registration server 160 with the host device information during a configuration or setup routine that is executed prior to any SWC registration or connection operations involving the host 120 (referred to as host enrollment). For example, enrollment may occur during or directly following the installation of the SWCHA 121 on the host 120.

In some embodiments, Device Info table 166 entries, which record information of devices associated with the system 100, exist independently of entries in the Registration table 164, which record present registrations of host-user device pairs. That is, a device 102 that is not registered with any corresponding host device may still have an entry in the Device Info table 166, for example, as a result of the removal of a previous registration of the device with a host.

Long Term Key table 164 stores cryptographic Long Term Key pairs, each including a Long Term Device Key (LTDK) of the device and a Long Term Host Key (LTHK) of the host, for each device to host registration. The LTDK and LTHK values are represented as strings within the table 168. In some embodiments, the LTDK and/or LTHK may be stored in a secure form, for example as an encrypted or hashed text of the actual key value. LTDK and LTHK values are generated by a key generator module 163 at a time of registration of the pair with the system 100.

Registration server 160 also includes a communications module 161 that exchanges data. computer devices, including the host device 120, through communications network 150 using, for example, protocols such as Transmission Control Protocol (TCP) or Internet Protocol (IP) for Internet communication. In some embodiments, the SWCHA 121 is configured to enforce data exchanges between the registration server 160 and the host 120 using a secure protocol, such as Hypertext Transfer Protocol Secure (HTTPS).

Secondary Host Devices

Figure 1B:
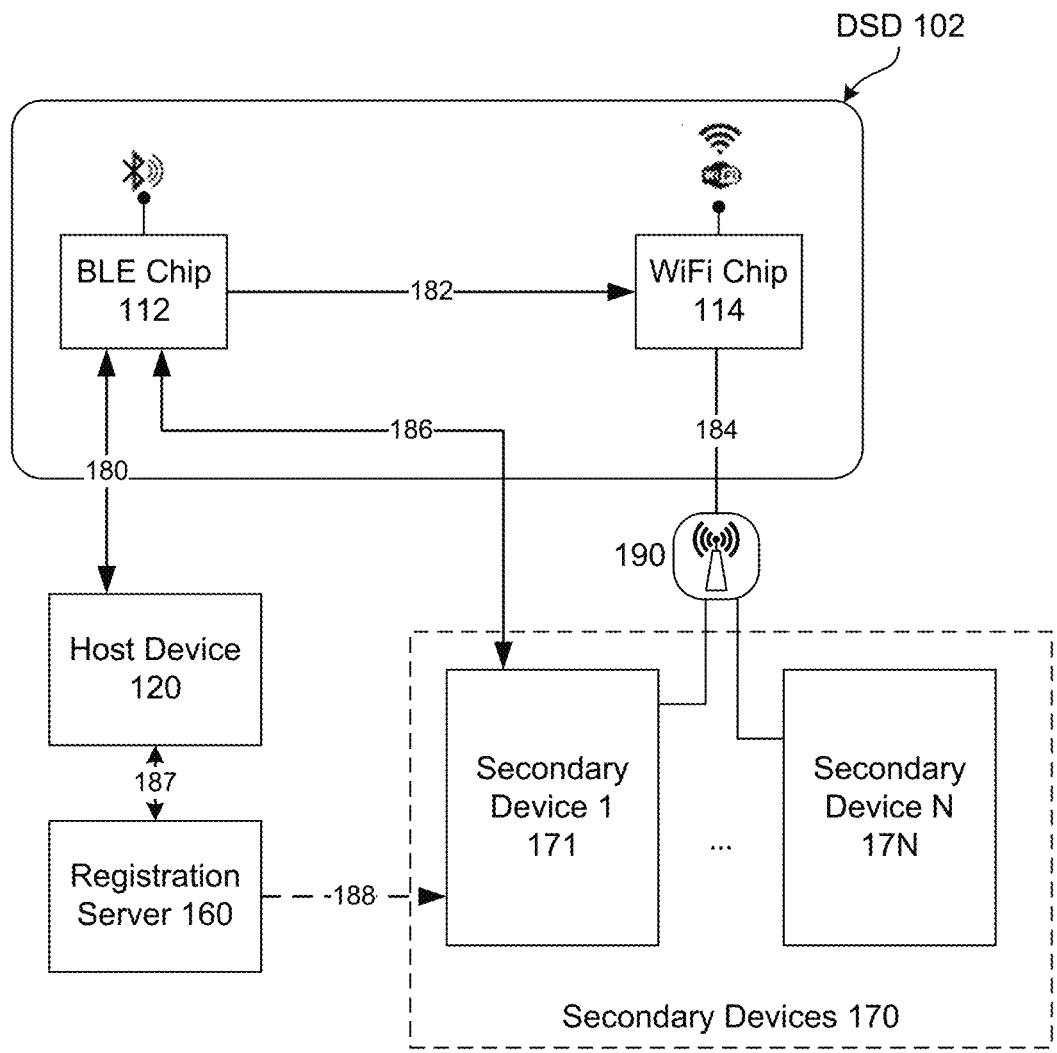
FIG. 1b illustrates a block diagram of communication between an example user device, an example host device, and one or more secondary devices according to one embodiment.

FIG. 1b shows secure wireless communication channels formed between the DSD 102, one or more secondary devices 170, and the host device 120 by the SWCS 100. A secure Bluetooth channel 180 is formed between host device 120 and DSD 102 (as described below). Data exchanges through channel 180 are secured by symmetric encryption using the shared secret generated by the host 120 and DSD 102. Using the secure channel 180, the host device 120 and DSD 102 may exchange sensitive data, such as authentication data for accessing one or more other networks. For example, host 120 may transfer authentication data 182 to the DSD 102 for accessing a wireless access point (WAP) 190 to which secondary devices 170 are connected.

Secure communication channels established between the DSD 102 and other devices are controlled by the BLE-Wi-Fi communications module 116. In the described embodiments, the module 116 is configured to facilitate internal data transfers between the BLE chip 112 and the Wi-Fi chip 114, such as via a dedicated communications bus. For example, the communications module 116 transfers the authentication data 182 internally from the BLE chip 112 to the Wi-Fi chip 114. This enables the DSD 102 to create a connection 184 to the WAP 190, via the Wi-Fi chip 114, based on authentication data 182 received from the host device 120 over the secured channel 180.

Alternatively, or in addition, the host 120 is configured to provide secondary device 171 secure access to the DSD 102 via a secondary secure Bluetooth channel 186. The creation of the secondary secure Bluetooth channel 186 is based on the prior verification of the host 120 as authorized to connect to the DSD 102. In response to the host 120 granting authorization for the secondary connection 187 to the registration server 160, the registration server 160 generates a connection token 188 to enable the secondary device 171 to establish the secondary secure Bluetooth channel 186 to the DSD 102. In the described embodiments, the connection token 188 is in the form of a certificate that is generated by the server 160 based on the pre-established registration of the host 120 and the DSD 102.

Secure Wireless Communication Process

Figure 3A:
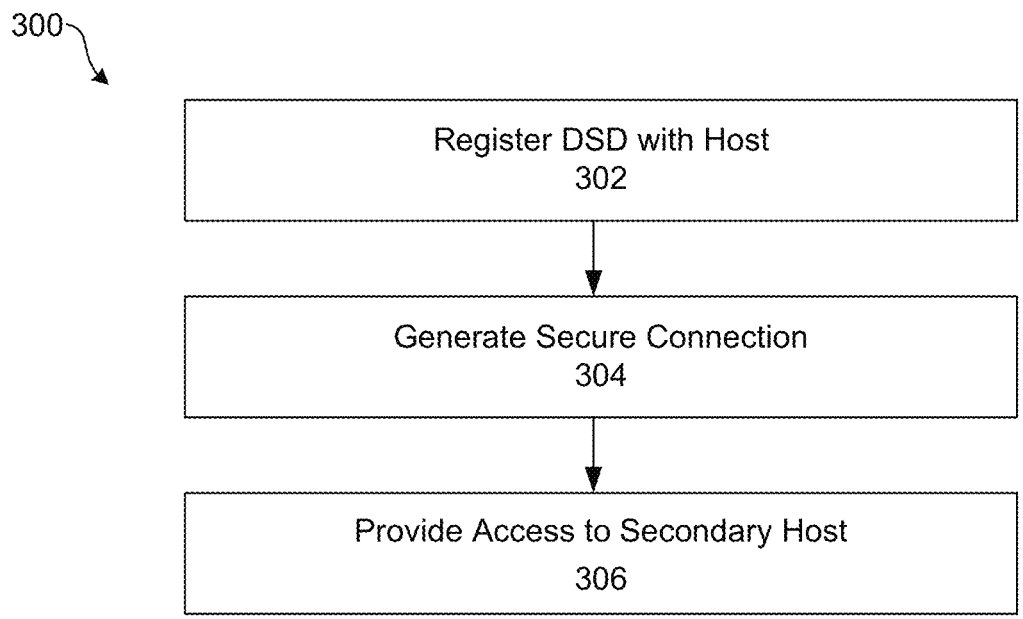
FIG. 3a is a flow diagram of a process for performing secure wireless communication by system 100 according to one embodiment.
Figure 3B:
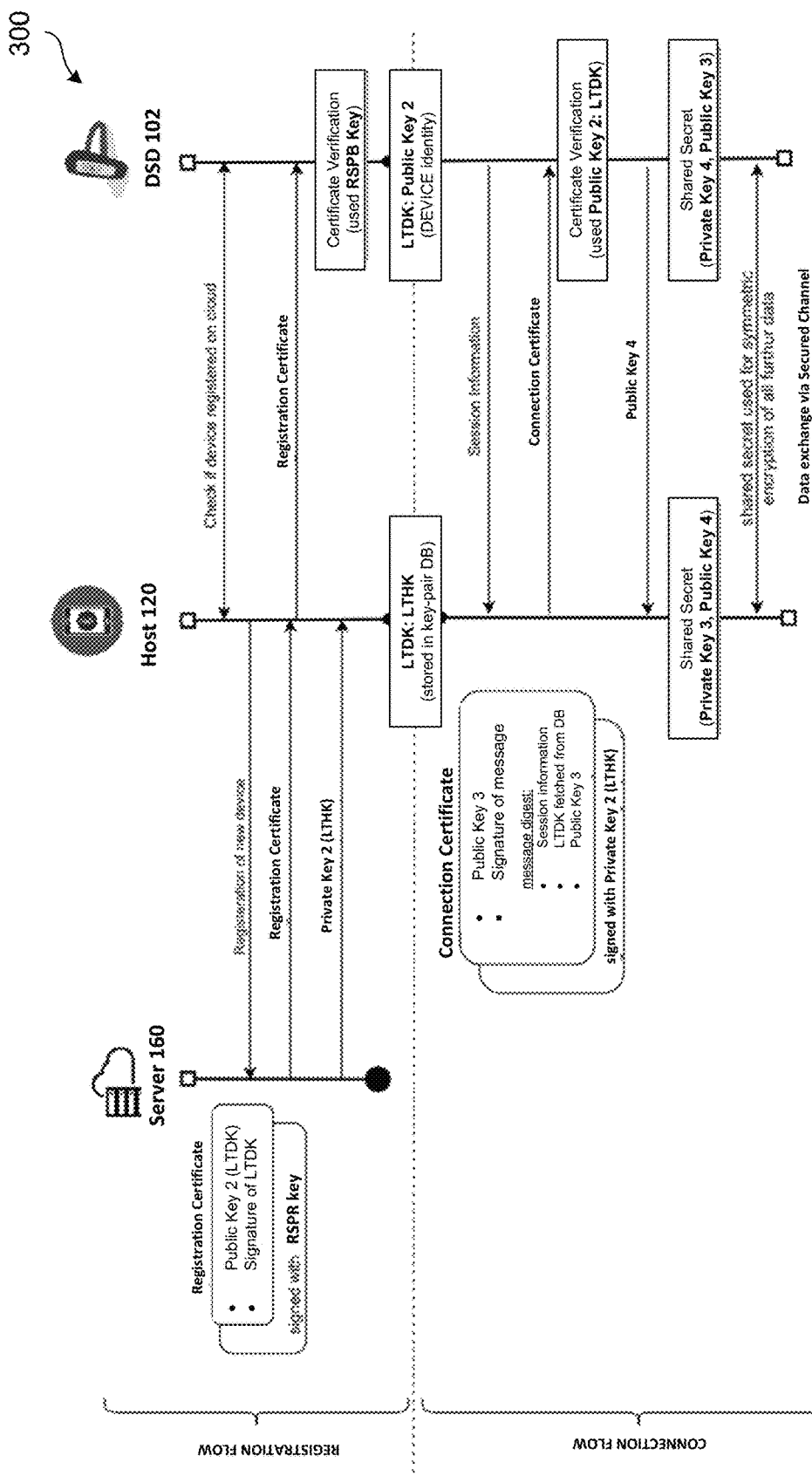
FIG. 3b is a sequence diagram of a process for performing secure wireless communication by system 100 according to one embodiment.
Figure 4:
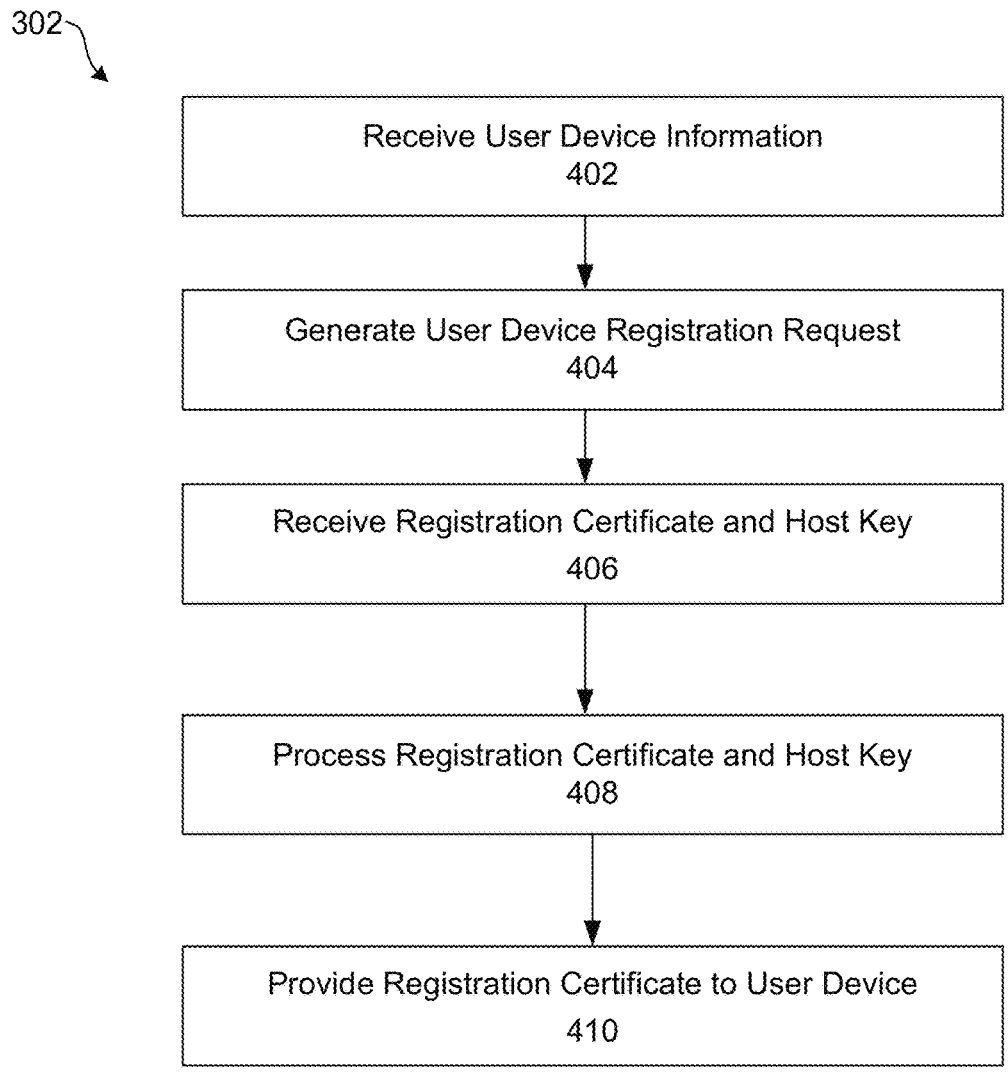
FIG. 4 is a flow diagram of a device registration sub-process of the secure wireless communication process according to one embodiment.

FIGS. 3a and 3b illustrate a flow diagram and a sequence diagram respectively of a process 300 for performing secure wireless communication with system 100. At step 302, the DSD 102 (user device) is registered with the host device 120 to enable secure wireless communication between the devices. FIG. 4 illustrates a device registration sub-process performed by the host 120. At step 402, the host 120 receives user device information for performing the registration. A user device information request is generated and transmitted to the DSD 102 by the SWCHA 121 of the host 120. The requested user device information includes, at least, an indication of the IDK of the DSD 102 and the current LTDK of the DSD 102.

Controller 110 of the DSD 102 processes the registration request by searching memory 103 for a stored LTDK. In some embodiments, the controller 110 of the DSD 102 is configured to return a value indicating a true or false response to the registration request (i.e., without indicating the LTDK). In other embodiments, the actual value of the LTDK stored in memory 103 is returned in response to the registration request. If the DSD 102 is not registered with any host 120 of the system 100, then no LTDK value is stored in the memory 103, and a null value is returned.

At step 404, the host 120 generates a user device registration request for server 160 to register DSD 102, the request including the user device information obtained at step 402. The user device registration request may also include information of the host device 120, including the host IDK and/or the LTHK. The registration server 160 processes the user device registration request and validates the user device information to determine the validity of the request. For example, the server 160 may check the supplied IDK and LTDK values against the Registration 164, LT Key 168 and Device 166 information of the data store 162. The user device registration request is determined to be invalid in the case that, for example, a registration is already recorded in the data store 162 for the DSD 102.

In response to determining that the user device registration request is valid, registration server 160 registers the DSD 102 in association with host 120 by: 1) generating a Long Term Key Pair for the host-device registration; 2) generating a registration certificate to securely provide the LTDK to the DSD 102; and 3) securely transmitting the LTHK to the host 120. In some embodiments, registration server 160 stores data representing the registration in the data store 162. For example, the server 160 may record an indication of the registration of device 102 with the host device 120 in the registration table 164, and record the generated Long Term key pair in the LT Key table 168.

The Long Term Key Pair includes a private LTHK value and a public LTDK value generated by the key generator 163. In the described embodiments, the key generator 163 implements a set of operations collectively configured to generate the LTHK and LTDK values using Elliptic-curve cryptography (ECC). Key generator 163 is invoked to determine the private and public key values based on key generation parameters, including: a public key length; a private key length; and an ECC curve. The key generator 163 is configured to access a representation of at least one ECC curve from the generation parameters, such as secp256k1, curve25519 or p521. The representation includes an indication of one or more key parameters, such as a curve name (e.g. secp256k1), a field size (which defines the key length, e.g. 256-bit), a security strength (usually the field size/2 or less), a metric indicating curve performance (e.g., operations/sec), and other domain parameters relevant to the cryptographic utility of the curve.

The ECC curve used for the key generation may be determined selectively by the key generator 163, e.g., based on input from an administrative user and/or other authority. In some embodiments, a particular curve is allocated as the default curve for key generation (e.g., secp256k1). Key generation module 163 retrieves the key parameters for the selected or default curve (in the absence of a selection) prior to generating the key values. For example, the domain parameters for the 256-bit curve secp256k1 implementation are defined as follows:

p (modulus)=0xFFFFFFFFFFFFFFFF FFFFFFFFFFFFFFFFFFFFFFFFFFFFFFFFEFFFFFC 2F n (order; size; the count of all possible EC points)=0xFFFFFFFFFFFFFFFFFFFF FFFFFFFFFFFFFEBAAEDCE6AF48 A03BBFD25E8CD036 4141 a (the constant "a" in y^2≡x^3+a*x+b (mod p))=0x0000000000000000000000000 0000000000000000000000000000000000000000 b (the constant "b" in y^2≡x^3+a*x+b (mod p))=0x0000000000000000000000000 0000000000000000000000000000000000000007 g (the curve generator point G {x, y})= (0x79BE667EF9DCBBAC55 A06295CE870B07029BFCDB2 DCE28D959F2815B16F81 798, 0x483ada7726a3c4655da4fbfc 0e1108a8fd17b448a68554199c47d08ffb10d4b8); and h (cofactor, typically 1)=01.

The private key is generated by a getPrivateKey(curve) routine that outputs an integer in the range of the curve's field size as a hex encoded value. An example of a 256-bit ECC private key generated by the key generator 163 is: 0x51897b64e85c3f714bba707e867914295a137 7a7463a9dae8ea6a8b914246319. Key generator 163 implements a corresponding routine getPublicKey(curve) to determine a corresponding public key by compressing the elliptic curve points (EC points) associated with the selected curve. The compressed public key value (i.e., the LTDK value) corresponding to the 256-bit ECC private key (i.e., the LTHK value), is a 257-bit integer. For example, the ECC public key corresponding to the above private key is: 0x02f54ba86dc1ccb5bed0224d23f01ed87e4a 443c47fc690d7797a13d41d2340e1a.

In other embodiments, the key generator 163 implements a set of operations collectively configured to generate the LTHK and LTDK values using an alternative public-private key cryptosystem, such as for example, RSA. The skilled addressee will appreciate that the methods and techniques described herein may also be performed with the use of any such alternative public-private key cryptosystem to determine the LTDK-LTHK pair.

Server 160 creates a registration certificate for the secure transmission of the LTDK value to the DSD 102. In the described embodiments, the registration certificate includes: certificate data, including at least the LTDK value; and a signature of the certificate data. The signature of the certificate data cryptographically verifies that the data (i.e., at least, the LTDK value) included in the registration certificate is generated by the server 160 (i.e., that it has not been modified by an unauthorized party).

In embodiments where the registration certificate data includes only the LTDK, the server 160 generates the signature of the certificate by applying a hashing function (e.g., SHA-1) to produce a hash value uniquely representing the LTDK value. The server 160 generates the signature of the certificate by encrypting the LTDK hash value with the registration server 160 private key value (RSPR Key), for example as: Sign(RSPR Key, hash(LTDK)). The RSPR Key is generated and stored in a non-volatile memory of the server 160 at a time prior to the registration.

At step 406, the host 120 receives registration information, including the registration certificate and the LTHK, from the registration server 160. The transfer of the LTHK value from the server 160 to the host 120 occurs via a secure HTTPS connection, thereby preventing a MITM attack from compromising the LTHK during the transmission. In some embodiments, the registration certificate is also transmitted to the host 120 via HTTPS.

The host 120 processes the received registration certificate and the LTHK value at step 408. In the described embodiments, the SWCHA 121 is configured to generate values of the registration data 126 for the registration of DSD 102 with the host 120, including: the MK of DSD 102; and the LTHK for signing connection information to be provided to the DSD 102 (as described below). In some embodiments, the host 120 also stores the registration certificate containing the LTDK of the DSD 102 as part of the registration data 126.

In some embodiments, the host 120 is configured to store some, or all, of the registration data 126 securely. That is, the LTHK may be stored within a dedicated hardware or software module depending on the device or operating system environment of the host 120, such as, for example, the Secure Enclave component in the Apple platform, or the Key store feature on the Android platform. The Secure Enclave component is a secure co-processor that includes a hardware-based key manager isolated from the main processor (i.e., to provide an extra layer of security for handling sensitive data). The Key store feature provides functionality to restrict when and how keys can be used, such as requiring user authentication for key use or restricting keys to be used only in certain cryptographic modes. Such secure storage and processing mechanisms greatly increases security of the LTHKs managed by the host 120, and therefore reduces the likelihood that an attacker will be able to compromise a secure wireless Bluetooth connection formed between the host 120 and a corresponding registered device 102.

At step 410, the host 120 transmits the registration certificate to the DSD 102. In one embodiment, the registration certificate is transmitted to the DSD 102 without the existence of a dedicated and/or secure communication channel between the host 120 and the device 102, such as via a broadcast signal or via an unencrypted channel established between the host 120 and the device 102. The controller 110 performs a two-step process to verify the received registration certificate and obtain the LTDK. Firstly, the DSD 102 extracts the LTDK and the signature value, and performs a decryption operation on the signature with the RSPB Key. The RSPB Key is stored in non-volatile memory 103 and is programmed into the DSD 102 at manufacture. Even if the registration certificate is intercepted during the transmission, an attacker will not have knowledge of the RSPR Key used to sign the registration certificate, and therefore cannot forge the signature value.

The decryption of the signature with the RSPB Key provides a value representing the hash of the certificate data, as generated by server 160. The controller 110 applies the same hashing function as used by the server 160 (e.g., SHA-1) to the data (i.e., LTDK value) extracted from the registration certificate. In response to a match between the output of the decryption of the signature and the hash generated locally by the controller 110, the registration certificate is considered valid. That is, in this case the DSD 102 has verified that the certificate originated from the server 160, and the registration certificate is validated. In response to the validation of the registration certificate by the DSD 102, as received from the host 120, the LTDK of the certificate is stored within the memory 103 of the DSD 102.

The registration step 302 may be initiated by the SWCHA 121 of the host 120 in response to the selection of a registration operation by a user of the application 121 (e.g., selecting "Register a new device" on the UI 122). Host 120 generates and transmits a registration request to the DSD 102. The registration request may include an identifier of the host 120, such as an IDK value, a host hardware ID value, or a host device network address value.

In response to receiving the registration request, the DSD 102 is configured to generate and transmit a registration acknowledgement indicating whether the DSD 102 is able to be registered with host 120. In some embodiments, a positive indication of registration is provided when one or more particular registration conditions are met, including for example: the DSD 102 is presently not registered to any host (e.g., as indicated by a null LTDK); and the DSD 102 is placed into a 'registration mode'. In some embodiments, the registration mode enables the DSD 102 to be registered to a requesting host device 120 irrespective of any present registration with any particular host. The registration mode may be activated for the DSD 102 via the actuation of a physical element on the DSD 102 (e.g., a 'registration' or 'reset' button), or by the receipt of a registration activation message by the DSD 102.

Figure 5:
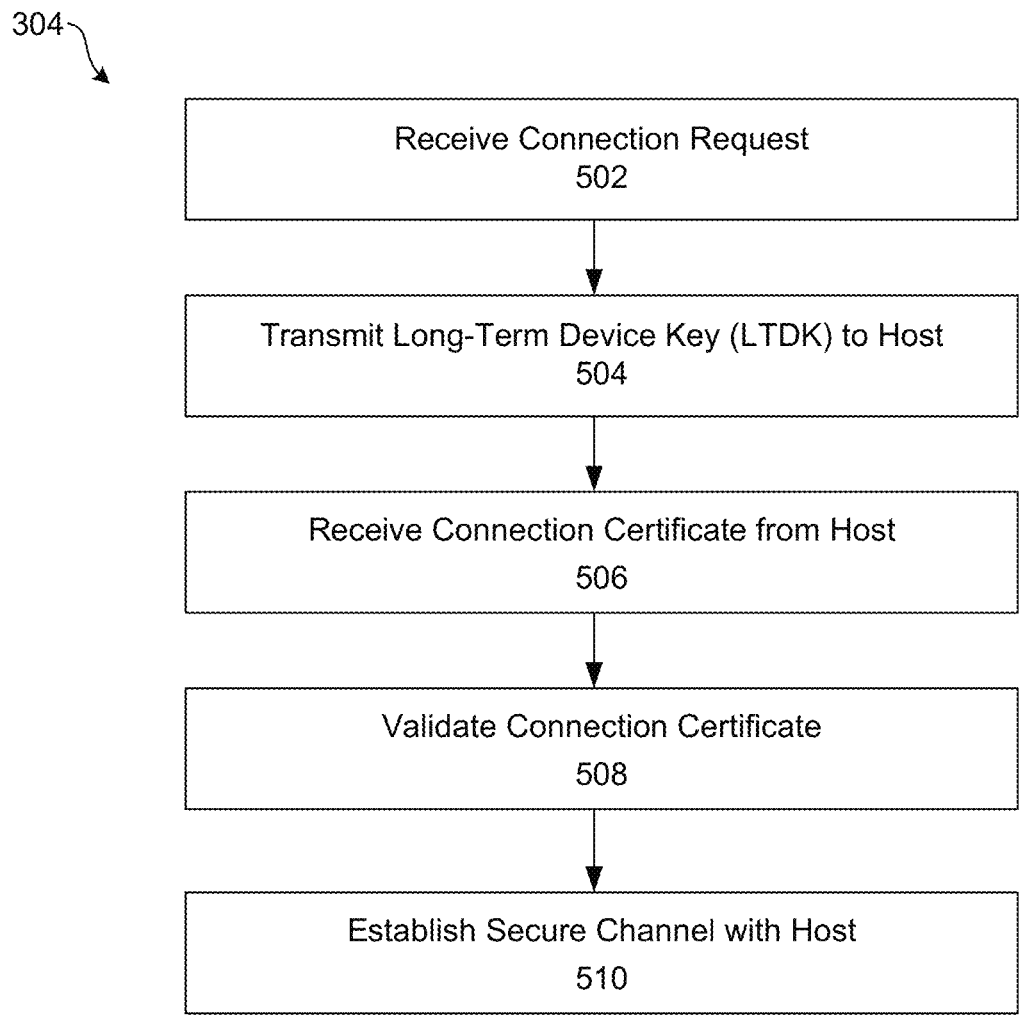
FIG. 5 is a flow diagram of a connection sub-process of the secure wireless communication process according to one embodiment.

Following registration, at step 304 of FIGS. 3a and 3b the host 120 creates a secure Bluetooth connection with the DSD 102. FIG. 5 illustrates a secure connection sub-process performed by the DSD 102 to secure a Bluetooth connection to the registered host 120. At step 502, the DSD 102 receives a secure connection request for securing a Bluetooth connection between the DSD 102 and a host 120. The connection request is generated and transmitted by the SWCHA 121 of the host 120. For example, the user of the host device 120 may operate interactive interface elements rendered by the UI module 122 to select the DSD 102, and to select a corresponding "Initiate secure connection" option. The secure connection request includes, at least, data identifying the host 120, such as for example a host IDK value, a host hardware ID value, or a host device network address value.

At step 504, in response to receiving the secure connection request, the DSD 102 transmits a connection acknowledgement to the host 120. In the described embodiments, the connection acknowledgement includes the LTDK of the DSD 102. The returned LTDK value is processed by the SWCHA 121 of the host 120 to determine whether registration with server 160 must be performed prior to the creation of a secure wireless connection with the DSD 102. For example, if the LTDK value is null then the host 120 initiates the registration process of step 302 to register the DSD 102 with the host 120.

In response to verifying that the DSD 102 is registered with the host 120, the host 120 generates connection data to form a secured Bluetooth connection for the exchange of data with the DSD 102. The connection data includes session data describing properties of the Bluetooth connection to be initiated between the host 120 and DSD 102. For example, the session data may include, at least, a session identifier (session ID) that is unique for the connection session between the DSD 102 and the host 120. In some embodiments, the host 120 is configured to receive the session data from the DSD 102, such as for example within the connection acknowledgement. In some embodiments, the connection data includes data identifying the host 120, such as for example a host IDK value, a host hardware ID value, or a host device network address value.

In some embodiments, the connection data further includes: the LTDK of the DSD 102, as retrieved from the registration data 126 of the host 120; and a public Short-Term Host Key (public STHK) value to be used in the establishment of a shared secret between the host 120 and DSD 102 for the session. The public STHK is generated in conjunction with a corresponding private STHK value, the public and private STHK values forming a cryptographic key pair for establishing a secure connection with the devices (as described below). The connection data is secured by the generation of a cryptographic signature by the host 120. The SWCHA 121 is configured to hash the connection data, and sign the resulting hash value with the private host key (i.e., the LTHK). The SWCHA 121 of the host 120 generates a connection certificate to encapsulate the connection data, and the corresponding signature value, for transmission to the DSD 102.

At step 506, the DSD 102 receives the signed connection certificate from the host 120. Since the LTHK of the host 120 and the LTDK of the DSD 102 form a cryptographic Long Term Key pair, and since the LTHK value is kept secret by the host 120, the generated connection data contained within the connection certificate is secured against unauthorized modification by an attacker.

At step 508, the DSD 102 validates the connection certificate to determine the host 120 as authorized to connect to the DSD 102. The controller 110 of the DSD 102 extracts the cryptographic signature value from the certificate and performs a decryption operation on the signature value using the LTDK. The controller 110 also extracts the connection data and applies the hashing function to the values.

The controller 110 applies the same hashing function as used by the SWCHA 121 of the host 120 (e.g., SHA-1) to the connection data extracted from the connection certificate. In response to a match between the output of the decryption of the connection signature and the hash generated locally by the controller 110, the connection certificate is considered valid. That is, in this case the DSD 102 has verified that the connection certificate originated from the host 120, since only host 120 has knowledge of the LTHK corresponding to the LTDK, and therefore that the host 120 is authorized to connect to the DSD 102.

Dynamic Session-Based Shared Secret Generation

At step 510, in response to determining the host 120 as authorized to connect to the DSD 102, the DSD 102 establishes a shared secret with the host 120. In the described embodiments, the shared secret is a cryptographic key pair defined asymmetrically for each of the host 120 and DSD 102, where the corresponding key pairs are established, at each device, based on: a short-term host key (STHK) pair of the host. and a corresponding short-term device key (STDK) pair of the device.

The individual keys of the STHK pair and the corresponding STDK pair are generated uniquely for the session at the host 120 and DSD 102 respectively. At the DSD 102, the controller 110 initiates a secure session key creation function to cause the processor 105 to generate the DSD session key pair (private STDK, public STDK). The processor 105 forms the shared secret by combining the private STDK of the DSD session key pair with the public STRK value, as extracted from the validated connection certificate.

The controller 110 transmits the public STDK value to the host 120. The SWCHA 121 generates the shared secret of the host 120 to DSD 102 communication session as (private STHK, public STDK). The private STHK value is generated by the host 120 prior to the generation of the connection certificate, and is securely stored by the host 120.

In the described embodiments, the session key pairs are produced by the Elliptic-curve Diffie-Hellman (ECDH) key agreement protocol, as implemented by routines of the SWCDA 101 and SWCHA 121 of the DSD 102 and host 120 respectively. At the host 120, the generation of the STHK pair is performed in response to the receipt of the session information for the connection. At the DSD 102, the controller 110 generates the STDK pair in response to the validation of the connection certificate, and using the connection data contained within the certificate (e.g., the public STHK and the session data). The shared secret enables the encryption of data transmitted between the host 120 and the DSD 102 (e.g., using AES-CCM or similar), and thereby results in the creation of a secure Bluetooth transmission channel between the devices (as shown, for example, as channel 180 in FIG. 1b).

In the described embodiments, the controller 110 is configured to generate the session data dynamically for each particular secure connection request received from the host 120. In one implementation, at least the generated session ID is both unique for each connection, and changes in an unpredictable manner across sessions. For example, the controller 110 may invoke a pseudo-random number generator to generate session IDs as a sequence of random integers seeded with a particular session seed value (i.e., as securely stored in the memory 105). In other implementations, the session IDs may be generated by the use of a sequential counter, or a counter in combination with a pseudo-random number generator (e.g., to provide an initial seed value for the counter).

Unlike conventional Bluetooth pairing, the establishment of the shared secret in the described secure wireless communication process 300 is session specific. That is, on termination of the secure connection (i.e. channel) between the host 120 and the DSD 102, the shared secret (i.e., the corresponding STHK and STDK pairs) are deleted from the respective devices. The formation of a new secure communication channel requires the host 120 to generate and transmit a new secure Bluetooth connection request to the DSD 102, in accordance with step 502. Therefore, the described embodiments are advantageous in that the session information used to create the shared secret is dynamically generated for each connection between the host device 120 and the connected device (e.g., DSD 102). That is, the shared secrets are generated using different Short Term Host Key and Short Term Device Key pairs for each secure connection request. This ensures perfect forward secrecy as even if an attacker manages to obtain access to the session keys of a past connection, the present and future connections are still secured.

Secure Secondary Host Connection

With reference to FIG. 3a, following the establishment of a secure wireless channel between the DSD 102 and the host 120, at step 306 the SWC system 100 is configured to provide one or more secondary host devices 171-17N secure access to the DSD 102. The provision of a secondary device with secure access to the DSD 102 is based on the prior verification of the (primary) host 120 as authorized to connect to the DSD 102 (i.e., on the existence of a registration of the primary host 120 with DSD 102).

Figure 6:
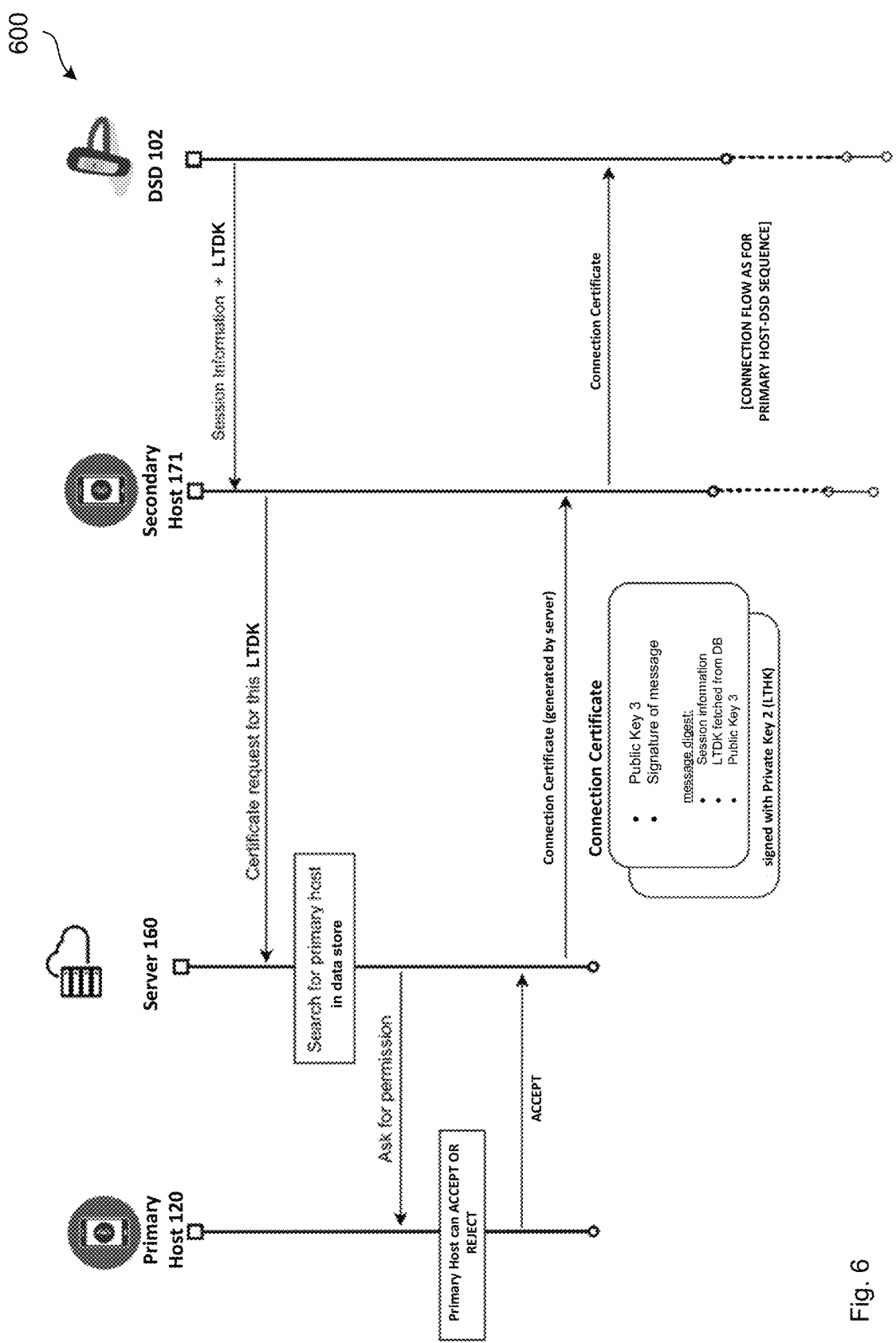
FIG. 6 is a sequence diagram of a secondary host access sub-process for performing secure wireless communication by system 100 according to one embodiment.
Figure 7:
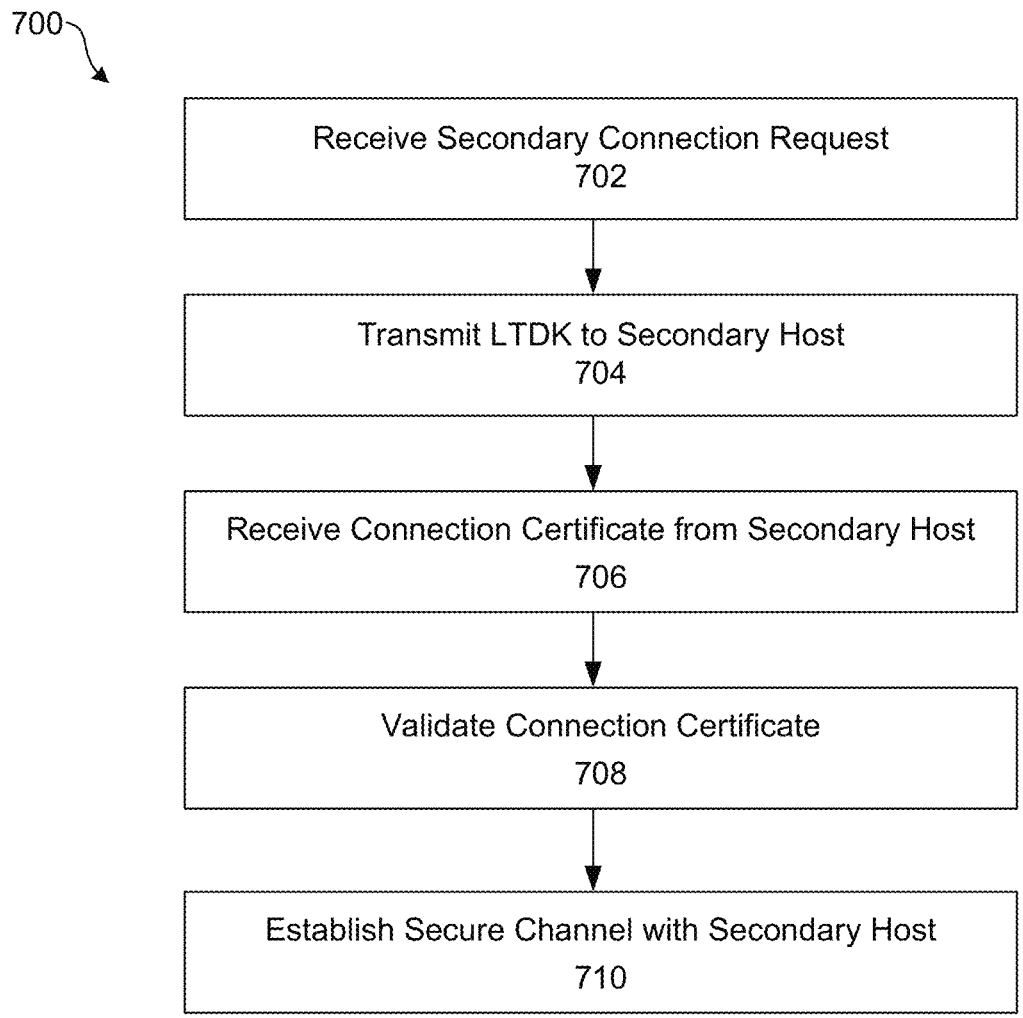
FIG. 7 is a flow diagram of a secondary host access sub-process of the secure wireless communication process according to one embodiment.

FIGS. 6 and 7 are sequence and flow diagrams respectively of a secondary host access sub-process 700 for performing secure wireless communication by the system 100. At step 702, the DSD 102 receives a secondary connection request for securing a secondary Bluetooth connection between the DSD 102 and a secondary host device 171. In the described embodiments, the secondary host device 171 is a mobile computing device of similar type to the primary host 120. and is configured to execute an instance of the SWCHA.

In some embodiments, the secondary connection request is generated and transmitted by the instance of the SWCHA executing on the secondary host device 171. For example, the user of the secondary device 171 may operate interactive interface elements rendered by the module to select the DSD 102, and a corresponding "Initiate secure connection" option. The secure connection request includes, at least, data identifying the secondary host 171, such as for example a host IDK value, a host hardware ID value, or a host device network address value.

At step 704, in response to receiving the secure connection request, the DSD 102 transmits a connection acknowledgement to the secondary host 171. In the described embodiments, the connection acknowledgement includes, at least, the LTDK of the DSD 102. The returned LTDK value is processed by the SWCHA of the secondary host 171 to determine the registration state of the DSD 102, and specifically whether: i) the DSD 102 is unregistered; ii) the DSD 102 is registered to the secondary host 171 (i.e., confirming its status as a primary host of the DSD); or iii) the DSD 102 is registered to some other host device (i.e., confirming its status as a secondary host of the DSD).

In the described example, a non-null LTDK value indicates to the secondary host 171 that the DSD 102 is registered to a host device (i.e., (i) does not apply). To determine whether the secondary host 171 is actually the (primary) registered host, the SWCHA executing on the host 171 searches its registration data 126 for an LTHK value corresponding to the LTDK of the DSD 102. In the described embodiments, the LTHK is not contained within the registration data 126 since secondary host 171 is not the primary host for the DSD 102 (i.e., since the DSD 102 is actually registered with host 120). In response to failing to find the LTHK in the local memory structure 126, the SWCHA of host 171 transmits a certificate request to the registration server 160. The certificate request includes at least the LTDK of the DSD 102 and an identifier of the secondary host 171 (such as a host IDK value, a host hardware component ID, and/or a host network address value).

The registration server 160 receives the certificate request and processes the request by: extracting the LTDK of the DSD 102 and an identifier of the secondary host 171; and searching the data store 162 for an indication of the registered host device of DSD 102 (based on the LTDK value). The server 160 retrieves the entry with a matching LTDK value to the received LTDK value from the registration table 164, and cross-references the device info table 166 to retrieve the identifier of the registered host device. In the described example, in response to determining that the registered host identifier belongs to host 120, and not to secondary host 171, the registration server 160 generates and transmits a connection request to the primary host 120. The connection request includes: the identifier data of the secondary host 171, corresponding identifier data of the DSD 102, and other properties describing the request made by the secondary host 171 to the server 160 (e.g., the time of the request).

The SWCHA 121 executing on the host 120 is configured to receive the connection request, and process the request by providing the user of the host device 120 with means to accept or reject the request. For example, the UI module 122 may be configured to present elements on a display of the host device 120 showing an indication of the secondary host 171 and the DSD 102 (as obtained from the connection request), and one or more interactive elements enabling the user to enter a connection request response to either authorize or deny the secondary host 171 to connect to the DSD 102.

The connection request response is transmitted by the SWCHA 121 to the registration server 160. In the case that the connection request response authorizes the secondary host 171 to connect to the DSD 102, the registration server 160 generates connection data required by the secondary host 171 for the formation of a secured Bluetooth connection with the DSD 102. As described above for the secure connection with host 120 (i.e., in step 304), the connection data includes session data describing properties of the Bluetooth connection to be initiated between the secondary host 171 and DSD 102, The server 160 utilizes the session data provided to the secondary host 171 by the DSD 102 (i.e., within the connection acknowledgment at step 704). The server 160 secures the connection data by cryptographically signing the connection data (or a hashed representation, as described above) with the LTHK of the host 120. The server 160 generates a connection certificate to encapsulate the connection data, and the corresponding signature value, for transmission to the secondary host 171.

The server 160 transmits the generated connection certificate to the secondary host 171. The transfer of certificate data from the server 160 to the secondary host 171 occurs via a secure HTTPS connection, thereby preventing a MITM attack from compromising the certificate during the transmission. In some embodiments, the registration server 160 is configured to record secondary connection data in association with the authorization of the secondary host 171 to connect with the DSD 102 (e.g., within the registration table 164, or a similar structure).

At steps 706 and 708, the DSD 102 receives the connection certificate from the secondary host 171, and validates the connection certificate to determine the secondary host 171 as authorized to connect to the DSD 102. As described above, the validation of the connection certificate involves decrypting the connection signature with the LTDK, and subsequently verifying the connection data of the certificate. At step 710, in response to determining the secondary host 171 as authorized to connect to the DSD 102, the DSD 102 establishes a shared secret with the secondary host 171, as for the host 120 to DSD 102 connection (i.e., described above in step 510).

In the described embodiments, both primary 120 and secondary 171 host devices execute an instance of the SWCHA, each of which is configured to receive input from the respective users. Registration server 160 provides an interface for a host device to request certificate information that is based on the provision of the LTDK of the user device (i.e., the DSD 102), irrespective of whether the host device requesting to connect to the DSD 102 is a primary host (i.e., the host to which the DSD 102 is registered to), or a secondary host (i.e. host 171). That is, the device requesting a certificate provides an indication of the LTDK to the server 160, and the LTDK is processed by the server 160 to determine the certificate that is returned to the host device 120.

In the described embodiments, in response to the certificate request the primary host 120 receives the registration certificate, which it may subsequently pass to the DSD 102, and an LTHK value corresponding to the LTDK contained in the registration certificate. In some embodiments, the LTHK value is persistently stored in the registration data 126 of the host device 120. such that subsequent connections (i.e., after successful registration and provision of the LTHK and LTDK to the host 120 and DSD 102 respectively) between the host 120 and the DSD 102 are formed without receiving data from the server 160. That is, the connection flow (step 304) is not reliant on any communication occurring with the registration server 160. In such embodiments, the primary host is able to generate connection certificates to form secure wireless connections to the DSD 102 on demand in an ad-hoc manner without further communication from the server 160.

By contrast, in response to the request the secondary host 171 receives a pre-generated connection certificate as a form of token which may be used to form a secure wireless connection with the DSD 102. The provision of the connection token to the secondary host 171 is based on authorization by the host 120, where authorization for the connection must be obtained from the server 160 (i.e., via a separate request) for each single connection between the secondary host 171 and the DSD 102.

In some embodiments, the LTHK and LTDK pair is invalidated in response to one or more invalidation conditions, such as: the expiry of a duration of time since the generation of the key pair by the server 160; a change in hardware detected for either the host 120 or DSD 102; and the total number of distinct secure connections made between the DSD 102 and the host 120 exceeding a predetermined threshold number. In this case, the SWCHA 121 and/or SWCDA 101 may be programmed to securely delete the respective LT keys forcing the registration step 302 to be completed before further secure wireless channels may be formed using the approach. In some embodiments, each DSD 102 can be registered with a pre-specified maximum number of host devices 120. That is, in response to a DSD 102 being registered with the pre-specified maximum number of hosts, the registration server 160 is configured to refuse further requests to register the DSD 102 by other host devices.

Time Latency

The systems and methods of the described embodiments provide secure Bluetooth connections between the DSD 102 and one or more host devices while introducing minimal latency into the connection procedure.

Experimental evaluations were conducted to evaluate the latency introduced into the process of establishing a secure connection between the DSD 102 and the host 120. The evaluations measured the delay associated with the: generation of the connection certificate; cryptographic signing of the certificate; and decrypting of the certificate to extract the connection data. Based on a SECP256R1 ECC curve, the extra bytes that need to be transmitted are, on average, around 400 bytes in size. According to transmission rates under the Bluetooth Low Energy protocol (where high latency may be most impact is results in a delay of approximately 0.4 milliseconds.

The experimental evaluation also measured involved an assessment of the delay of microcontroller-based C libraries for performing, public-key encryption operations. The results showed that a processing delay of around 2000-2400 milliseconds is introduced by the execution of an encryption or decryption routine according to ECDSA or ECM, for the mentioned ECC curve.

The experimental results illustrate that the processing delays introduced by the secure communication processes described herein are relatively small, such that these delays are likely to have only a minimal effect on the user experience (unlike other approaches that attempt to secure the JW protocol against MITM attacks).

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

The invention claimed is:

1. A method for secure wireless communication, the method executed by at least one processor of a device, and wherein the method comprises:

receiving, from a host, a secure connection request for securing a wireless connection between the device and the host;

in response to receiving the secure connection request, transmitting a connection acknowledgement to the host, wherein the connection acknowledgement includes a Long Term Device Key (LTDK) of the device;

receiving, from the host, a connection certificate including connection data for establishing the wireless connection between the host and the device, wherein:

the connection certificate is signed by a private Long Term Host Key (LTHK) of the host; and
the LTHK of the host and the LTDK of the device form a cryptographic Long Term Key pair;
validating the connection certificate using the LTDK of the device to determine whether the host is authorized to connect to the device; and
in response to determining that the host is authorized to connect to the device, establishing a first shared secret with the host based on the connection data, wherein:
the first shared secret establishes encryption of data transmitted over a wireless channel between the device and the host;
the LTDK is obtained from a registration certificate transmitted to the device by the host; and
the registration certificate is generated by a registration server in response to the registration of the host as authorized to connect to the device.

2. The method of claim 1, wherein the registration certificate is cryptographically secured by a registration server key pair associated with the registration server, the registration server key pair including:
a private server key used by the registration server to cryptographically sign the registration certificate; and
a public server key used by the device to verify the received signed registration certificate.

3. The method of claim 2, wherein the public server key is stored in a non-volatile memory of the device prior to the device receiving the registration certificate.

4. The method of claim 1, further comprising:
transmitting, to the host, user device information including an identification key (IDK) of the device, wherein the user device information is provided to the registration server by the host as a request to register the host as authorized to connect to the device; and
in response to the registration server verifying, using the IDK of the device, that no host is registered as being authorized to connect to the device, receiving from the registration server, via the host, the registration certificate including the LTDK generated by the registration server, wherein the corresponding LTHK generated by the registration server is transmitted to the host.

5. The method of claim 1, wherein;
the first shared secret is established by exchanging public keys comprising:
a short-term host key (STHK) pair of the host; and
a corresponding short-term device key (STDK) pair of the device; and
the public keys of the STHK pair and the corresponding STDK pair are generated uniquely for a session of the wireless connection.

6. The method of claim 1, wherein the connection acknowledgement includes a session identifier, the session identifier being uniquely generated by the device for a session of the wireless connection.

7. The method of claim 6, wherein the connection certificate is generated by the host and includes, based on the connection acknowledgement received by the host, the device LTDK and the session identifier.

8. The method of claim 7, wherein the host secures the connection certificate by signing the connection certificate with the LTHK of the host, such that validation of the connection certificate with the LTDK verifies the host to the device for the session.

9. The method of claim 1, further comprising:
receiving a secondary connection request for securing a secondary wireless connection between the device and a secondary host;
in response to the secondary connection request, transmitting a secondary connection acknowledgement to the secondary host, wherein the secondary connection acknowledgement includes the LTDK of the device;
receiving, from the secondary host, a secondary connection certificate including connection data for establishing the secondary wireless connection between the secondary host and the device, wherein the secondary connection certificate is cryptographically signed by the LTHK of the host;
validating the secondary connection certificate to determine the secondary host as authorized to connect to the device; and
in response to determining the secondary host as authorized to connect to the device, establishing a second shared secret with the secondary host based on the connection data, wherein:
the second shared secret enables encryption of data transmitted between the device and the secondary host over the secondary wireless connection; and
the LTHK is transmitted to the secondary host by the registration server in response to the host providing authorization for the secondary host to connect to the device.

10. A data storage device, comprising:
a non-volatile storage medium configured to store user data;
a communications module configured to:
transmit data wirelessly between a host computer system and the non-volatile storage medium; and
establish a wireless connection with the host computer system; and
at least one processor coupled to the non-volatile storage medium and the communications module via a data path, wherein the at least one processor is configured to:
receive, from the host computer system, a secure connection request for securing the wireless connection with the host computer system;
in response to receiving the secure connection request, transmit a connection acknowledgement to the host computer system, wherein the connection acknowledgement includes a Long Term Device Key (LTDK) of the data storage device;
receive, from the host computer system, a connection certificate including connection data for establishing the wireless connection between the host computer system and the data storage device, wherein:
the connection certificate is signed by a private Long Term Host Key (LTHK) of the host computer system; and
the LTHK of the host computer system and the LTDK of the data storage device form a cryptographic Long Term Key pair;
validate the connection certificate using the LTDK of the data storage device to determine whether the host computer system is authorized to connect to the data storage device; and
in response to determining the host computer system as authorized to connect to the data storage device, establish a first shared secret with the host computer system based on the connection data, wherein:

the first shared secret enables encryption of data transmitted over a wireless channel between the data storage device and the host computer system;

the LTDK is obtained from a registration certificate transmitted to the data storage device by the host computer system; and the registration certificate is generated by a registration server in response to the registration of the host computer system as authorized to connect to the data storage device.

11. The data storage device of claim 10, wherein the registration certificate is cryptographically secured by a registration server key pair associated with the registration server, the registration server key pair including:

a private server key used by the registration server to cryptographically sign the registration certificate; and a public server key used by the data storage device to verify the received signed registration certificate.

12. The data storage device of claim 11, wherein the public server key is stored in a non-volatile memory of the data storage device prior to the data storage device receiving the registration certificate.

13. The data storage device of claim 10, wherein the at least one processor is further configured to:

transmit, to the host computer system, user device information including an identification key (IDK) of the data storage device, wherein the user device information is provided to the registration server by the host computer system as a request to register the host computer system as authorized to connect to the data storage device; and in response to the registration server verifying, using the IDK of the data storage device, that no host computer system is registered as being authorized to connect to the data storage device, receive from the registration server, via the host computer system, the registration certificate including the LTDK generated by the registration server, wherein the corresponding LTHK generated by the registration server is transmitted to the host computer system.

14. The data storage device of claim 10, wherein:

the first shared secret is established by exchanging public keys of:

a short-term host key (STHK) pair of the host computer system; and a corresponding short-term device key (STDK) pair of the data storage device; and the public keys of the STHK pair and the corresponding STDK pair are generated uniquely for a session of the wireless connection.

15. The data storage device of claim 14, wherein:

the connection acknowledgement includes a session identifier; and the session identifier is uniquely generated by the data storage device for the session.

16. The data storage device of claim 15, wherein the connection certificate is generated by the host computer system and includes, based on the connection acknowledgement received by the host computer system, the device LTDK and the session identifier.

17. The data storage device of claim 16, wherein the host computer system secures the connection certificate by signing the connection certificate with the LTHK of the host computer system, such that validation of the connection certificate with the LTDK verifies the host computer system to the data storage device for the session.

18. The data storage device of claim 10, wherein the at least one processor is further configured to:

receive a secondary connection request for securing a secondary wireless connection between the data storage device and a secondary host computer system;

in response to the secondary connection request, transmit a secondary connection acknowledgement to the secondary host computer system, wherein the secondary connection acknowledgement includes the LTDK of the device;

receive, from the secondary host computer system, a secondary connection certificate including connection data for establishing the secondary wireless connection between the secondary host computer system and the data storage device, wherein the secondary connection certificate is cryptographically signed by the LTHK of the host computer system;

validate the secondary connection certificate to determine the secondary host computer system as authorized to connect to the data storage device; and in response to determining the secondary host computer system as authorized to connect to the data storage device, establish a second shared secret with the secondary host computer system based on the connection data, wherein:

the second shared secret enables encryption of data transmitted between the data storage device and the secondary host computer system over the secondary wireless connection; and the LTHK is transmitted to the secondary host computer system by the registration server in response to the host computer system providing authorization for the secondary host computer system to connect to the device.

19. A host configured for secure wireless communication with a device, the host comprising:

means for transmitting, to the device, a secure connection request for securing a wireless connection between the device and the host;

means for receiving, from the device, a connection acknowledgement including a Long Term Device Key (LTDK) of the device;

means for generating a connection certificate including connection data for establishing the wireless connection between the host and the device, wherein:

the connection certificate is signed by a private Long Term Host Key (LTHK) of the host; and the LTHK of the host and the LTDK of the device form a cryptographic Long Term Key pair; and means for transmitting the connection certificate to the device to validate the connection certificate using the LTDK of the device, wherein:

in response to the device determining that the host is authorized to connect to the device, the device establishes a shared secret with the host based on the connection data;

the shared secret enables encryption of data transmitted over a wireless channel between the device and the host;

the LTDK is obtained from a registration certificate transmitted to the device by the host; and the registration certificate is generated by a registration server in response to the registration of the host as authorized to connect to the device.

20. The host of claim 19, further comprising:
means for receiving, from the device, user device information including an identification key (IDK) of the device;
means for transmitting the user device information to the registration server as a request to register the host as authorized to connect to the device;
means for receiving, from the registration server, the signed registration certificate, wherein the registration certificate is received in response to the registration server verifying, using the IDK of the device, that no host is registered as being authorized to connect to the device;
means for transmitting the registration certificate to the device, wherein the registration certificate includes the LTDK generated by the registration server; and
means for receiving, from the registration server, the corresponding LTHK generated by the registration server.

* * * * *